(12) United States Patent
Matsumi et al.

(10) Patent No.: US 7,194,548 B1
(45) Date of Patent: Mar. 20, 2007

(54) DATA TRANSMISSION APPARATUS, RECEIVING APPARATUS, AND SENDING APPARATUS

(75) Inventors: Chiyoko Matsumi, Suita (JP); Junji Yoshida, Neyagawa (JP); Masazumi Yamada, Osaka (JP); Yukio Kurano, Higashi-osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/937,934

(22) PCT Filed: Mar. 29, 2000

(86) PCT No.: PCT/JP00/01928

§ 371 (c)(1),
(2), (4) Date: Oct. 1, 2001

(87) PCT Pub. No.: WO00/60445

PCT Pub. Date: Oct. 12, 2000

(30) Foreign Application Priority Data

| Mar. 30, 1999 | (JP) | ................................. 11/089084 |
| Apr. 6, 1999  | (JP) | ................................. 11/099457 |
| Apr. 9, 1999  | (JP) | ................................. 11/102694 |
| Apr. 14, 1999 | (JP) | ................................. 11/107212 |

(51) Int. Cl.
*G06F 13/00* (2006.01)

(52) U.S. Cl. ...................... 709/236; 709/231; 709/246; 709/250

(58) Field of Classification Search ................ 709/217, 709/219, 230, 231, 232, 236, 237, 246, 248; 719/321

See application file for complete search history.

(56) References Cited

U.S. PATENT DOCUMENTS 5,602,595 A * 2/1997 Citta et al. .................. 348/495

(Continued)

FOREIGN PATENT DOCUMENTS

JP  10-302391  11/1998

(Continued)

OTHER PUBLICATIONS

Japanese search report for PCT/JP00/01928 dated Jul. 18, 2000.

(Continued)

*Primary Examiner*—Viet D. Vu
(74) *Attorney, Agent, or Firm*—RatnerPrestia

(57) ABSTRACT

A data transmission apparatus for conveying proper timing information to the destination application without embedding such information in transmission data packets. Particularly, the apparatus comprises a timing component for generating and inserting additional timing information into the header at least first packet of each frame of the data stream for transmitting to a destination node. The apparatus further comprises a receiving device for extracting the additional timing information from the transmission path header and inserting the additional timing information to data packets to be sent to application. The application utilizes the added timing for processing the received data simultaneously.

39 Claims, 22 Drawing Sheets

U.S. PATENT DOCUMENTS

| | | | |
|---|---|---|---|
| 5,742,623 A * | 4/1998 | Nuber et al. | 714/798 |
| 5,828,416 A * | 10/1998 | Ryan | 348/512 |
| 5,878,045 A * | 3/1999 | Timbs | 370/466 |
| 5,881,245 A * | 3/1999 | Thompson | 709/219 |
| 5,959,684 A * | 9/1999 | Tan et al. | 348/515 |
| 5,977,468 A * | 11/1999 | Fujii | 84/609 |
| 6,055,246 A * | 4/2000 | Jones | 370/503 |
| 6,115,531 A * | 9/2000 | Yanagihara | 386/67 |
| 6,141,385 A * | 10/2000 | Yamaji | 375/240.27 |
| 6,169,843 B1 * | 1/2001 | Lenihan et al. | 386/46 |
| 6,222,841 B1 * | 4/2001 | Taniguchi | 370/389 |
| 6,236,432 B1 * | 5/2001 | Lee | 375/240.26 |
| 6,333,950 B1 * | 12/2001 | Karasawa | 375/240.23 |
| 6,359,656 B1 * | 3/2002 | Huckins | 348/512 |
| 6,556,590 B1 * | 4/2003 | Saeijs et al. | 370/504 |

FOREIGN PATENT DOCUMENTS

| | | |
|---|---|---|
| JP | 11-53844 | 2/1999 |
| JP | 11-65773 | 3/1999 |

OTHER PUBLICATIONS

English translation of Japanese search report for PCT/JP00/01928 dated Jul. 18, 2000.

* cited by examiner

Fig. 7

| FRAME NUMBER | TIME INTERVALS INFORMATION | |
|---|---|---|
| | START TIME | END TIME |
| 0 | 0 | 1*1.001/30 |
| 1 | 1*1.001/30 | 2*1.001/30 |
| 2 | 2*1.001/30 | 3*1.001/30 |
| 3 | 3*1.001/30 | 4*1.001/30 |
| .. | .. | .. |
| n | n*1.001/30 | (n+1)*1.001/30 |
| .. | .. | .. |

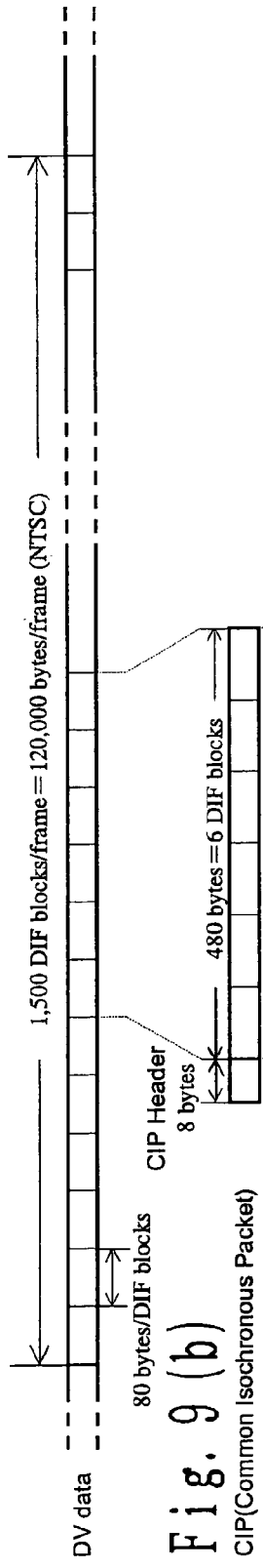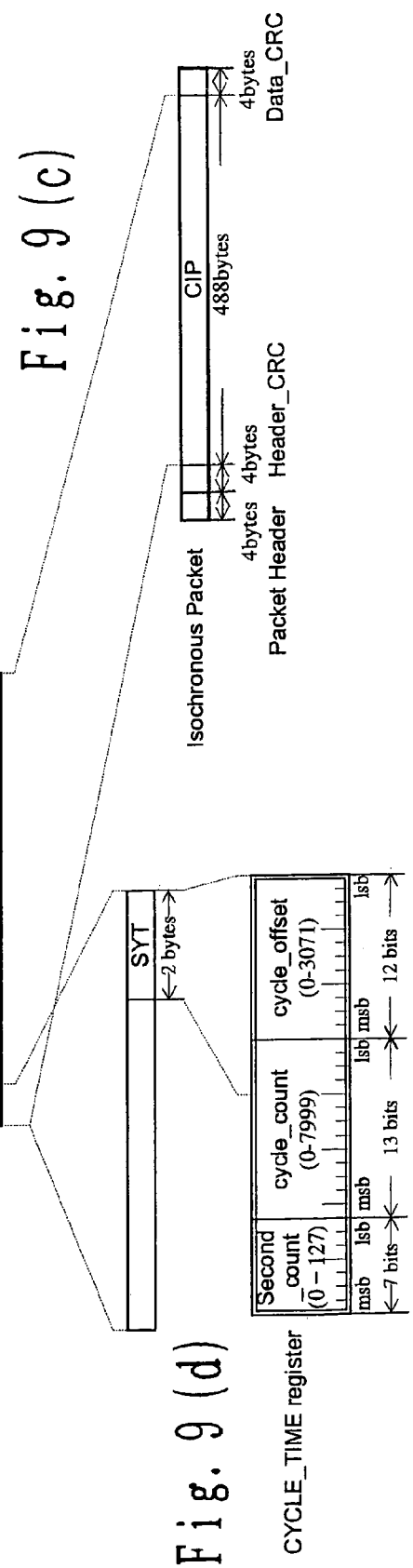

Fig. 11

| FRAME NUMBER | FORMULA FOR CALCULATING SYT | SYT VALUE WHEN $T_s = 0\ \mu sec$ AND $t_{so} = 250\ \mu sec$ |
|---|---|---|
| 0 | $T_s + t_{so}$ | $2000_H$ |
| 1 | $T_s + t_{so} + 1*1.001/30$ | $CB34_H$ |
| 2 | $T_s + t_{so} + 2*1.001/30$ | $7A68_H$ |
| 3 | $T_s + t_{so} + 3*1.001/30$ | $299C_H$ |
| .. | .. | .. |
| n | $T_s + t_{so} + n*1.001/30$ | .. |

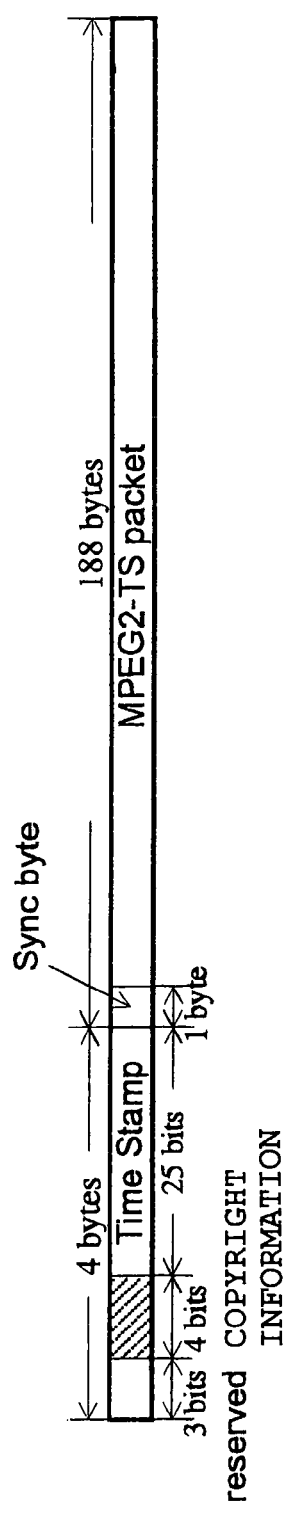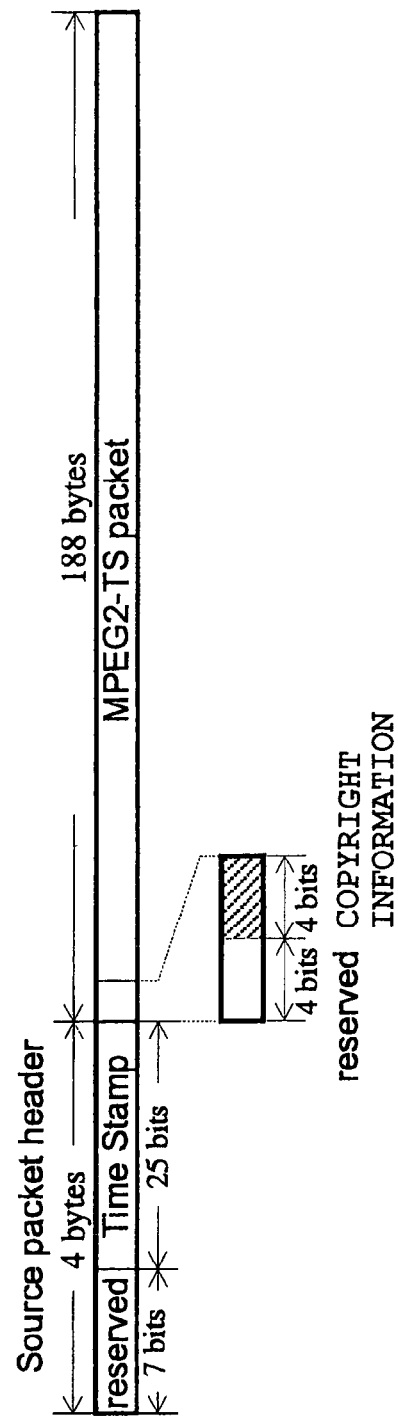
Fig. 17 (a)
Fig. 17 (b)

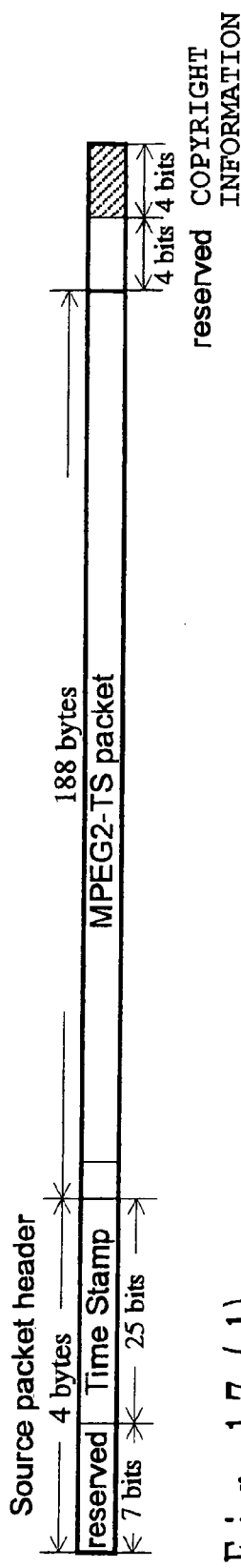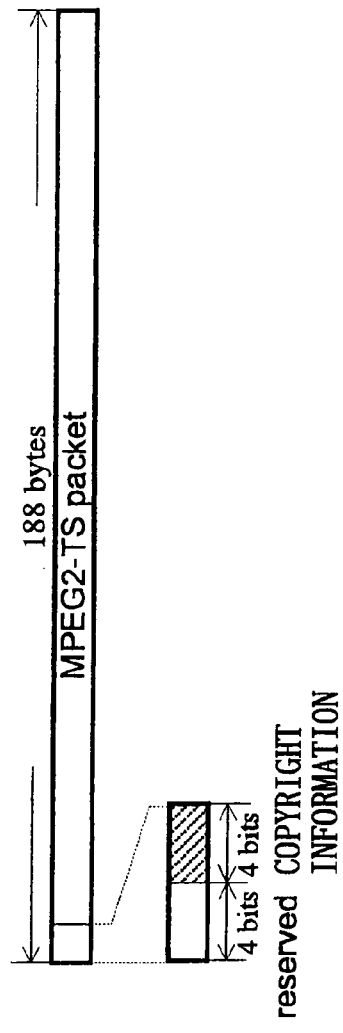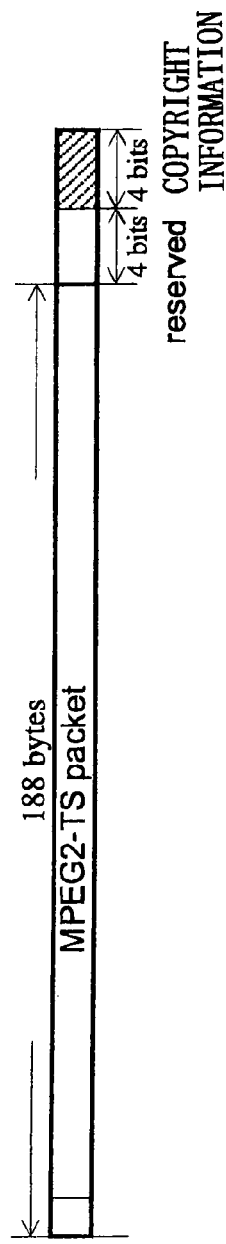

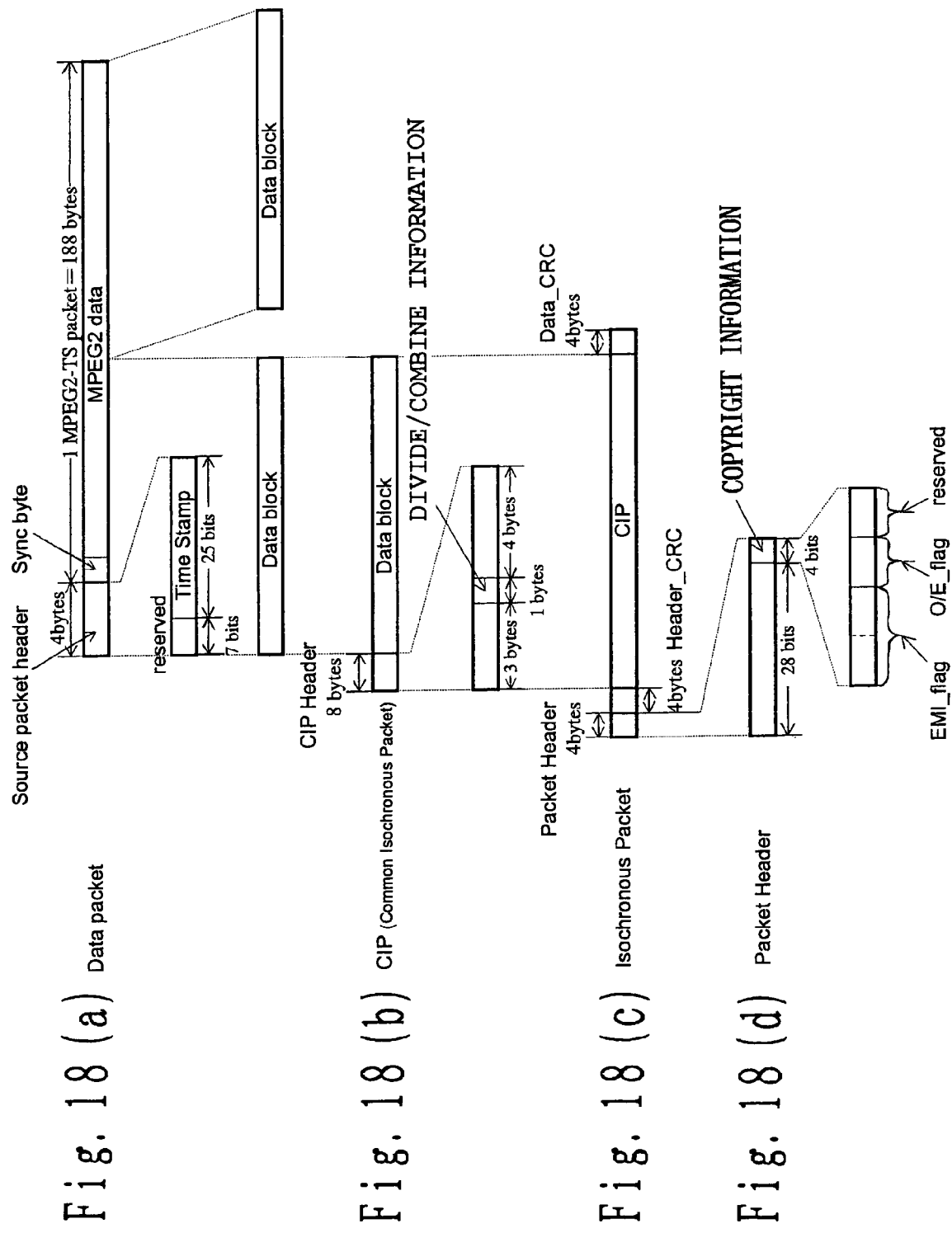

DATA TRANSMISSION APPARATUS, RECEIVING APPARATUS, AND SENDING APPARATUS

THIS APPLICATION IS A U.S. NATIONAL PHASE APPLICATION OF PCT INTERNATIONAL APPLICATION PCT/JP00/01928.

FIELD OF THE INVENTION

The present invention relates to a file processing system, a file processing method and a program recording medium for displaying file management information which denotes in what manner a file is recorded on a recording medium or for processing a file which is designated by the file management information.

The present invention also relates to a sending/receiving apparatus and a sending/receiving method for processing while treating stream data, which are recorded in a stream data recording/reproducing apparatus which performs real-time transmission, as a file on appearance.

The present invention further relates to an apparatus for and a method of transmission which realize real-time transmission of stream data and a sending/receiving apparatus and a sending/receiving method for transmitting data which contain copyright information.

BACKGROUND ART

Currently available as recording apparatuses for recording data in a personal computer (hereinafter referred to as "PC") include floppy disk drives (hereinafter referred to as "FDD"), hard disk drives (hereinafter referred to as "HDD") and CD-ROM units, etc. These recording apparatuses are connected with PCs via interfaces called IDE, SCSI, etc.

Operations of such a recording apparatus which is connected with a PC, hardware inside the PC, etc., are controlled by software called "Operating system (hereinafter referred to as "OS")" which is represented by Windows, MacOS and UNIX. Introduced in the OS is a concept of file system, for the purpose of handling data recorded on a recording medium of each recording apparatus, such as an FDD and a CD-ROM unit, as a file. A file system is a system in which each piece of data partitioned as a file bears information, such as a file name, a location at which the file data are recorded, a file length, a recording date/hour and the like, to thereby organize and manage such that data are treated as a file.

For example, a Windows PC is formed by hardware, kernel mode software serving as the OS and user mode software serving as applications. The OS known as Windows98 uses a file system called "FAT (File Allocation Table)" for an FDD and an HDD and a file system called "CDFS (CD File System)" for a CD-ROM unit. Software which controls the file systems is a file system driver (hereinafter referred to as "FSD"), and the FDS is contained in the OS. Only through the FSD, an access can be made to data (file), e.g., reading from a medium in the recording apparatus and writing recorded data (file).

By the way, digital interfaces based on new standards such as IEEE1394 Standard have been introduced to PCs, which has made it possible to connect a PC with equipment such as a VCR (for instance, DV (Digital Video Cassette)) which records and reproduces video and speech.

However, since DVs are not compatible with file systems, even when a DV is connected with a PC, a problem remains that the PC can not treat a content which is recorded in the DV as a file, and therefore, a file system for the DV (DV File system, abbreviated as DVFS) and a file system driver for the PC to handle the DVFS are necessary.

Further, even with the file system introduced to the DV, an application writes data in a file through the FSD by means of the following or repetition of the same.

(1) File OPEN instruction—designation of a file name (2) WRITE instruction to write in the opened file—designation of a write start position, a write data size and data-to-write (3) File CLOSE instruction The application and the OS determine the order of writing, the write size and the write timing, which is viewed from the DV as an asynchronous random request. In a similar manner, an application reads data from a file through the FSD by means of the following or repetition of the same:

(1) File OPEN instruction—designation of a file name (2) READ instruction to read from the opened file—designation of a read start position and a read data size (3) File CLOSE instruction The application and the OS determine the order of reading, the read size and the read timing, which is viewed from the DV as an asynchronous random request.

Sending and receiving stream data, the DV has a problem that it is impossible to respond to an asynchronous random access described above. Hence, a mechanism for responding to such an access is needed.

An action of switching operations little by little is not a premise for a magnetic tape recording machine of the sequential type such as a DV, and hence, even if the mechanism operates minutely to respond to a random access, as an operation mode for the mechanism is changed more frequently for which processing takes long, the mechanism and a tape get damaged. In addition, while such a random access is necessary to execute special processing such as editing, if the purpose is only to reproduce and display or copy AV data in real time, using stream data all at a time is more efficient. It is also necessary to appropriately accommodate an application for accessing asynchronously and at random and an application for handling stream data all at once.

On the other hand, for the purpose of connecting PCs with external equipment via IEEE1394 I/Fs, a WDM driver based on the WDM (Windows Driver Model) architecture has been introduced for Windows98 as a new driver which complies with IEEE1394 which is different from existing architectures, which has created an environment called DirectShow for handling stream data, such as video/audio data, on a PC. Although fusion of PCs and digital video/audio equipment, such as DVs, has been promoted in this manner, since PCs have never initially considered handling synchronous data, the current mechanisms can not handle real-time data without a break.

In other words, while sending from a PC to a DV demands to send a fixed amount of data for each video frame such that predetermined frame intervals are maintained, in the case that a part or all of processing is realized by software on the PC, processing of one frame does not complete in a constant period of time. Although a PC has a mechanism to instruct a processing time for processing data per unit, if a certain frame has used a long processing time, the subsequent instruction is to delay a processing time of the next frame rather than giving a higher priority to processing of the next frame. Hence, it is not possible to keep sending while maintaining predetermined frame intervals.

A number of digital video/audio apparatuses, including not only DVs but also set top boxes for receiving MPEG2-TS data (hereinafter referred to as "STB"), are capable of transferring data with other equipment by means of IEEE1394 I/Fs.

Further, from a standpoint of protection of copy right, for transmission of AV data, a scheme of transmitting copy right information on a header of an IEEE1394 transmission packet was proposed in "5C Digital Transmission Content Protection White Paper" in July, 1998. Since a current PC does not have a mechanism to deal with copy right information regarding AV data, a new mechanism to handle AV data in accordance with copy right information is necessary to send and receive AV data between PCs and other AV equipment.

SUMMARY OF THE INVENTION

There currently is a problem that a DV, sending and receiving stream data, can not respond to an asynchronous random access. Accordingly, the object of the present invention is to solve the problem that a mechanism for responding to such an access is necessary.

A further object of the present invention is to solve the problem that despite the recent ongoing fusion of PCs and digital video/audio equipment such as DVs, since PCs have never initially considered handling synchronous data, the current mechanisms can not handle real-time data without a break.

A still further object of the present invention is to solve the problem that a new mechanism to handle AV data in accordance with copy right information is necessary to send and receive AV data between PCs and other AV equipment.

One aspect of the present invention is a data processing system comprising an operating system which contains a file system driver and a device driver, characterized in comprising:

a real-time interface driver which processes data of a device which comprises an interface which is required to ensure real-time processing during recording and/or reproducing;

a non real-time interface driver which processes data of a device which comprises an interface which is not required to ensure real-time processing during recording and/or reproducing;

an IFS manager which allocates instructions for predetermined processing regarding a file system to each one of control means which are to handle the instructions;

first control means which, using first file management information with respect to data which are in a first medium which is housed in the device which is required to ensure said real-time processing, converts an instruction for said predetermined processing inputted through said IFS manager into a data processing instruction on said first medium and sends to said real-time interface driver; and second control means which, using second file management information with respect to data which are in a second medium which is housed in the device which is not required to ensure said real-time processing, executes processing for accessing to a file on said second medium in accordance with the instruction for said predetermined processing inputted through said IFS manager and sends the instruction for said predetermined processing to said non real-time interface driver via an I/O sub system.

Another aspect of the present invention is a data processing system comprising an operating system which contains a file system driver and a device driver, characterized in comprising:

display application means which displays files which can be handled in a file system, selects a desired file from the displayed files, and starts processing which is associated with said selected file;

a first processing part which executes processing on a first medium which stores data of a device which comprises an interface which is required to ensure real-time processing during recording and/or reproducing;

a second processing part which executes processing on a second medium which stores data of a device which comprises an interface which is not required to ensure real-time processing during recording and/or reproducing;

device identifying means which identifies a device in which said selected file exists; and a file starter part which drives said first or said second processing part in accordance with the identification result made by said device identifying means.

Still another aspect of the present invention is a data processing system comprising an operating system which contains a file system driver and a device driver, characterized in comprising:

a real-time interface driver which processes data of a device which comprises an interface which is required to ensure real-time processing during recording and/or reproducing;

a non real-time interface driver which processes data of a device which comprises an interface which is not required to ensure real-time processing during recording and/or reproducing;

an IFS manager which allocates instructions for predetermined processing regarding a file system to each one of control means which are to handle the instructions;

first control means which, using first file management information with respect to data of the device which comprises an interface which is required to ensure said real-time processing which are stored in a first medium, converts an instruction for said predetermined processing inputted through said IFS manager into a data processing instruction on said first medium and sends to said real-time interface driver; and second control means which, using second file management information with respect to data of the device which comprises an interface which is not required to ensure said real-time processing which are stored in a second medium, executes processing for accessing to a file on said second medium in accordance with the instruction for said predetermined processing inputted through said IFS manager and sends the instruction for said predetermined processing to said non real-time interface driver via an I/O sub system;

display application means which displays files which can be handled in a file system, selects a desired file from the displayed files, and starts processing which is associated with said selected file;

a first processing part which executes processing on a first medium which stores data of a device which comprises an interface which is required to ensure real-time processing during recording and/or reproducing;

a second processing part which executes processing on a second medium which stores data of a device which comprises an interface which is not required to ensure real-time processing during recording and/or reproducing;

drive identifying means which identifies a drive in which said selected file exists; and a file starter part which drives said first or said second processing part in accordance with the identification result made by said device identifying means.

Yet still another aspect of the present invention is a data transmission apparatus, comprising:

time intervals generating means which creates predetermined time of day information;

outputting means which outputs a series of data frames as stream data;

sending means which divides said series of data frames forming said stream into packet data and sends; and transmission managing means which manages said outputting means and said sending means, characterized in that said transmission managing means enters said stream data to said sending means based on said predetermined time of day information.

Still yet another aspect of the present invention is a data transmission apparatus, comprising:

data conversion means which divides inputted stream data and adds header information to each piece to thereby obtain packets, and inserts packet processing start time information which is for the data receiving side into the header information of at least first packet of each frame of said stream data and thereafter outputs; and an interface which, using a clock, outputs to a bus the packets processed by said data conversion means, at the transmission start time which corresponds to said packet processing start time information, characterized in that the packet processing start time information of said packets is expressed by:

$$T1 = X + Z + Y(N-1)$$

(where X>=0, Z>=0) assuming that X denotes the transmission start time for the first packet of the first frame, N denotes a frame number, Y denotes a frame period, Z denotes an initial value, and T1 denotes the processing start time of said packets.

A further aspect of the present invention is a receiving apparatus, comprising:

an interface which receives a transmission packet which contains a transmission path header in which additional information is described and data blocks;

transmission path header separator means which separates said transmission packet into said transmission path header and said data blocks;

additional information extracting means which extracts said additional information from said transmission path header;

data packet generating means which generates from said data blocks a data packet which is obtained by combining one or more of said data blocks; and additional information inserting means which adds or inserts said additional information to said data packet and outputs as an output packet of one type of data format which can be processed by an application simultaneously, characterized in that said application processes the output packet outputted from said additional information inserting means.

A further aspect of the present invention is a receiving apparatus, comprising:

an interface which receives a transmission packet which contains a transmission path header in which additional information is described and data blocks;

transmission path header separator means which separates said transmission packet into said transmission path header and said data blocks;

additional information extracting means which extracts said additional information from said transmission path header;

data packet generating means which generates from said data blocks a data packet which is obtained by combining one or more of said data blocks;

source packet header separator means which separates said data packet into a source packet header and a source packet; and additional information inserting means which adds or inserts said additional information to said source packet or replaces said additional information, and outputs as an output packet of one type of data format which can be be processed by an application simultaneously, characterized in that said application processes the output packet outputted from said additional information inserting means.

A still further aspect of the present invention is a data sending apparatus, comprising:

additional information separator means which, upon receipt of an input packet of one type of data format which can be processed by an application simultaneously, retrieves said additional information which is added or inserted to a data packet which forms said input packet;

data block generating means which generates one or more data blocks from said data packet;

transmission packet generating means which executes predetermined processing on said data blocks, inserts said additional information at a predetermined location in said data blocks, and accordingly generates said transmission packet; and an interface which sends said transmission packet.

A yet further aspect of the present is a sending apparatus, comprising:

additional information separator means which, upon receipt of an input packet of one type of data format which can be processed by an application simultaneously, constructs said input packet and retrieves said additional information from a transport packet which includes added, inserted or replaced additional information;

data packet generating means which combines a source packet header with said transport packet to thereby generate a data packet;

data block generating means which generates one or more data blocks from said data packet;

transmission packet generating means which executes predetermined processing on said data blocks, inserts said additional information at a predetermined location in said data blocks, and accordingly generates said transmission packet; and an interface which outputs said transmission packet.

BRIEF DESCRIPTION OF THE DRAWINGS

FIG. 7 is an explanatory diagram showing time intervals information used by the data transmission apparatus according to the sixth preferred embodiment;

FIGS. 9(*a*)–9(*d*) are explanatory diagrams showing a method of transmitting DV frame data on an IEEE1394 bus;

FIG. 11 is an explanatory diagram showing a method of calculating SYT;

FIGS. 17(*a*)–17(*e*) are explanatory diagrams showing a structure example of an input/output packet which is used in the eighth, the ninth, the tenth and the eleventh preferred embodiments;

FIGS. 18(*a*)–18(*d*) are explanatory diagrams showing a method of transmitting an MPEG2 TS packet on an IEEE1394 bus.

BEST EMBODIMENT FOR IMPLEMENTING THE INVENTION

In the following, preferred embodiments of the present invention will be described with reference to associated drawings.

First Preferred Embodiment

Figure 1:
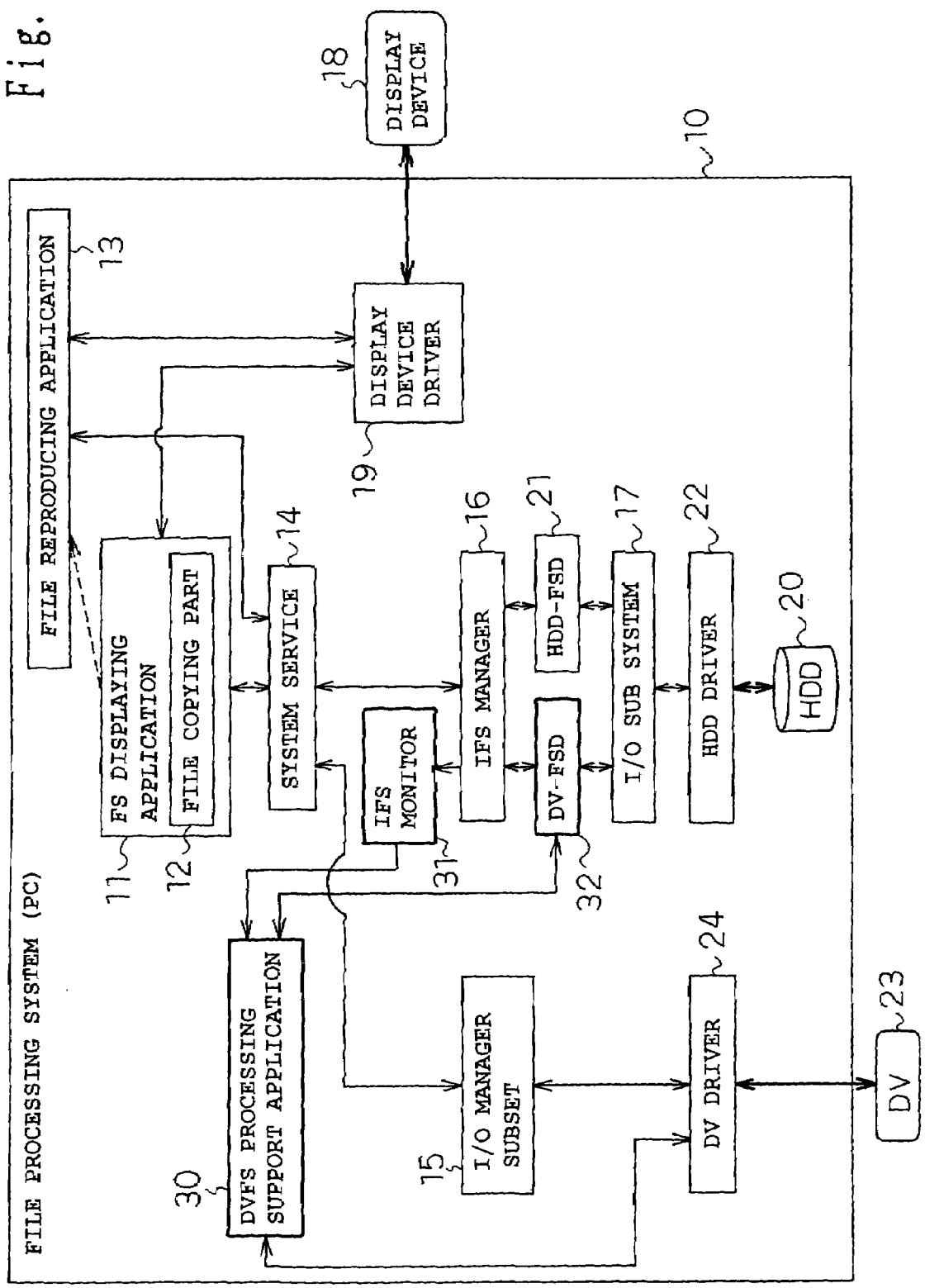
FIG. 1 is a block diagram of a file processing system according to a first preferred embodiment.

First, a structure of a file processing system according to a first preferred embodiment of the present invention will be described with reference to FIG. 1. FIG. 1 is a block diagram of the file processing system according to the first preferred embodiment. The following assumes that Windows PCs realize file processing systems. In FIG. 1, denoted at 10 is a PC (file processing system), denoted at 11 is an FS displaying application, denoted at 12 is a file copying application, denoted at 13 is a file reproducing application, denoted at 14 is a system service, denoted at 15 is an I/O manager subset, denoted at 16 is an IFS manager, denoted at 17 is an I/O sub system, denoted at 18 is a displaying device, denoted at 19 is a displaying device driver, denoted at 20 is a WDM-incompatible device (described as an HDD as an example in this embodiment), denoted at 21 is an HDD file system driver (HDD-FSD), denoted at 22 is an HDD driver, denoted at 23 is a WDM-compatible device (described as a DV as an example in this embodiment) and denoted at 24 is a DV driver, all of which are elements which already are present within conventional PCs. Denoted at 30 is a DVFS support application, denoted at 31 an IFS monitor, and denoted at 32 is a DV file system driver (DV-FSD).

Without the DVFS support application 30, the IFS monitor 31 and the DV-FSD 32, the file processing system 10 is merely a system which can handle files which are recorded in the HDD 20. Recorded files and a directory structure on the HDD 20 are managed by the HDD-FSD 21 based on an FAT (File Allocation Table).

The DV 23 houses a magnetic tape, and data can be recorded in the form of a file on the magnetic tape. File management information which is necessary to manage recorded files, a directory structure and the like is also recorded. The file management information may include tape-related information such as tape IDs and volume names, file entries each set for each file, directory entries each set for each directory, etc. Each entry consists of information such as a file name and a creation date, and a file entry further includes information such as a file size and a recording location on the tape. A file size may be a frame count or a byte count (or may be controlled in the both figures).

Now, the following will describe an operation in a case that a recorded content on the magnetic tape inside the DV 23 is displayed based on the associated file management information in the structure described above.

The description below assumes that a content recorded on the magnetic tape inside the DV 23 is displayed using the FS displaying application 11 which is used to display contents of files which are recorded on the HDD 20, an FDD, a CD-ROM or the like in the PC 10.

To obtain information regarding a desired file, first, the FS displaying application 11 sends an OPEN request to open that file to the DV-FSD 32 through the system service 14 and the IFS manager 16. After the DV-FSD 32 accesses the file management information and confirms the existence of the file and returns, the FS displaying application 11 sends an acquisition request for information such as a file size, a file update date/hour or the like to the DV-FSD 32 through the system service 14 and the IFS manager 16, and the DV-FSD 32 accordingly accesses the file management information, extracts the demanded information and returns the information. Upon acquisition of the desired information, the FS displaying application 11 sends a CLOSE request to close the file to the DV-FSD 32 through the system service 14 and the IFS manager 16, and the DV-FSD 32 accordingly discards the information held with respect to the file.

With the processing as described above repeated, one can look at a displayed list of recorded files using the FS displaying application 11 such as Explorer in Windows available from Microsoft Corporation.

Next, an operation in a case that a file in the DV 23 is copied to the HDD 20 will be described. First, a user selects a file in the DV 23 which is to copy from a list which is displayed by the FS displaying application 11, and instructs any desired directory on the HDD 20 as a copy destination. The file copying part 12 sends to the IFS manager 16 through the system service 14 information regarding the selected file and a copy request to the HDD 20.

More specifically, in this case, the request sent to the IFS manager 16 is a notice of starting processing a file (which is on the DV 23 or the HDD 20) (hereinafter referred to as "OPEN-Request"), a request to read data of a file (hereinafter referred to as "READ-Request"), a request to write data in a file (hereinafter referred to as "WRITE-Request"), or a notice of terminating processing on a file (hereinafter referred to as "CLOSE-Request").

An OPEN-Request is sent together with information regarding a file to designate, such as a file name, a device number and a file ID. A READ-Request and a WRITE-Request are sent together with information such as a file ID and a location and the size of demanded data in a file. A CLOSE-Request is sent together with a file ID.

The IFS manager 16 sends to the DV-FSD 32 an OPEN-Request regarding a file which is on the DV 23 selected as a copy source, thereafter sends a READ-Request for data, and then sends a CLOSE-Request after reading all data. Alternatively, the IFS manager 16 sends to the HDD-FSD 22 an OPEN-Request regarding the HDD 20 which is selected as a copy destination, thereafter sends a WRITE-Request for data, and then sends a CLOSE-Request after writing all data. In either case, a file name at the copy source and a file name at the copy destination are different when viewed as a full path name but the same as a file name excluding a directory-related portion.

The IFS monitor 31 has a function of monitoring an output from the IFS manager 16 and sending to the DVFS support application 30 (and may further have a function of discarding information which the DVFS support application 30 does not need). Hence, the IFS monitor 31 acquires the OPEN-Request, the READ-Request and the CLOSE-Request described above directed to the DV 23 and the OPEN-Request, the WRITE. Request and the CLOSE-Request described above directed to the HDD 20, and sends them to the DVFS support application 30.

The DV-FSD 32 extracts corresponding file management information based on the file name sent together with the OPEN-Request, and sends the extracted file management information together with each Request to the DVFS support application 30.

The DVFS support application 30 checks requests sent from the IFS monitor 31, and if there is a write request demanding a file on the HDD 20 which corresponds to a data read request demanding a file on the DV 23, the DVFS support application 30 determines that there is a request to copy the file on the DV 23 to the HDD 20 and executes processing of capturing, to the HDD 20 in real time, a section of DV stream data which are obtainable through the DV driver 24 from the DV 23, starting at a portion which is designated as the beginning of the file up to a portion which is designated as the end of the file.

Meanwhile, in the case of copying a file on the HDD 20 to the DV 23, in a manner opposite to the above, the IFS manager 16 sends a WRITE-Request to the DV-FSD 32 but a READ-Request to the HDD-FSD 22, so that the DVFS support application 30 performs processing of sending a file on the HDD 20 to the DV 23 and thereafter recording on the magnetic tape in the DV 23 starting at a portion which is designated as a record start position.

The processing above makes it possible to copy from the DV 23 to the HDD 20 and from the HDD 20 to the DV 23 file by file based on an asynchronous random request, even if the DV 23 is capable of only receiving and outputting stream data.

Second Preferred Embodiment

Figure 2:
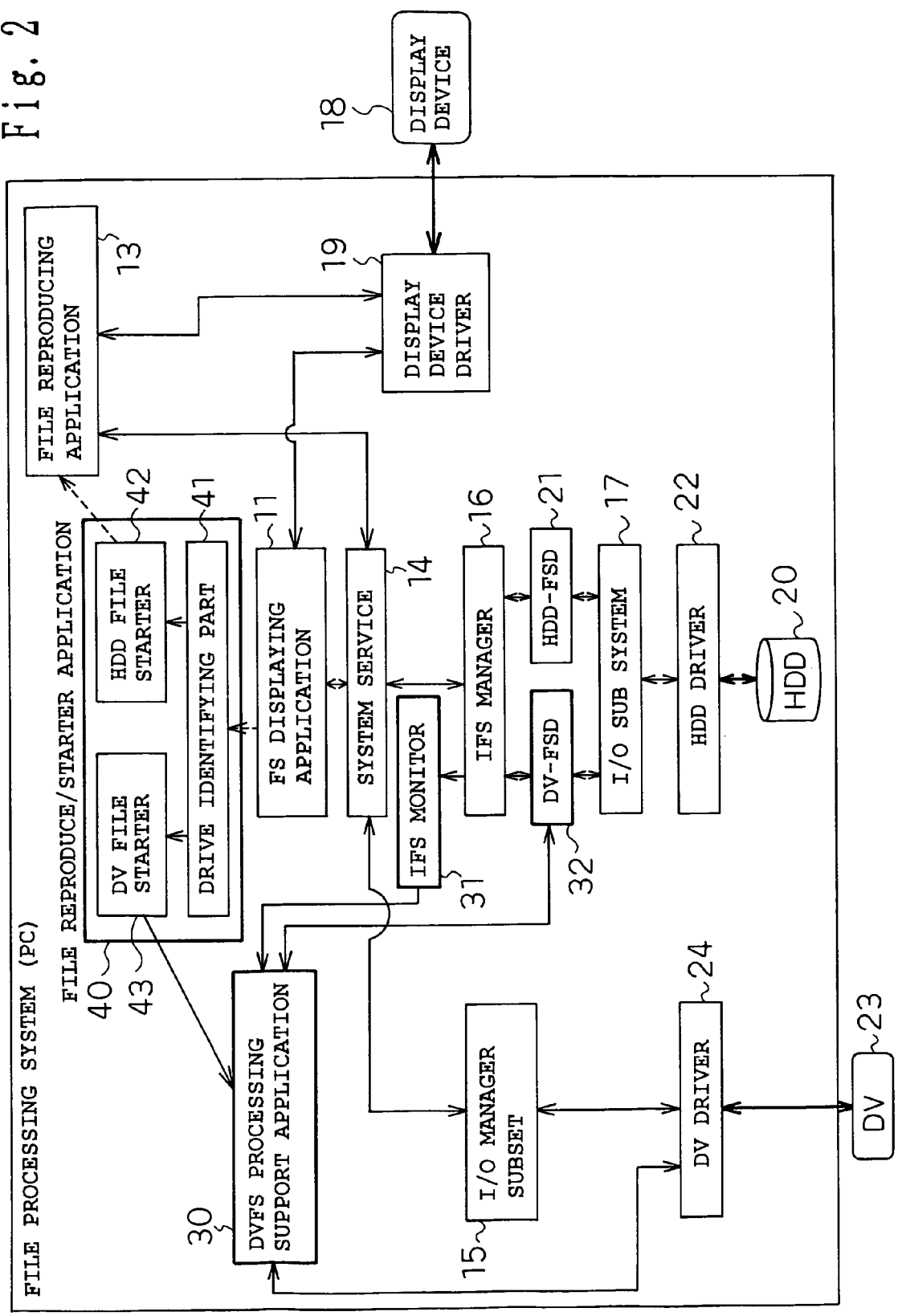
FIG. 2 is a block diagram of a file processing system according to a second preferred embodiment.

Next, a structure of a file processing system according to a second preferred embodiment of the present invention will be described with reference to FIG. 2. FIG. 2 is a block diagram of the file processing system according to the second preferred embodiment which is the same as the first preferred embodiment in that a Windows PC realizes the system. In FIG. 2, the structure is mostly the same as that shown in FIG. 1, and denoted at 40 is a file reproduce/starter application, denoted at 41 is a drive identifying part, denoted at 42 is an HDD file starter, and denoted at 43 is a DV file starter.

Now, the following will describe an operation in a case that a file recorded on a magnetic tape in the DV 23 is reproduced and displayed based on the associated file management information in the structure described above.

A mechanism is that as a file is selected and double-clicked in a file list provided by the FS displaying application 11, an application which is designated depending on the type of a file is selected and started, and the started application executes an operation of "opening" the selected file. In general, if the file represents AV data, the file reproducing application 13 is started. If it is on the HDD 20, with the file reproducing application 13, real-time reproduction is possible (This however bears a possibility that a video signal misses some frames.). When one wishes to "open" a file on the DV 23 as in the case of opening a file on the HDD 20, to reproduce and display AV data recorded in the DV 23 in real time is very difficult, and therefore, a dedicated application is necessary.

An application which is designated for an AV data file is not the file reproducing application 13 but is the file reproduce/starter application 40. As the file reproduce/starter application 40 is started, the drive identifying part 41 judges on which drive a selected file is present. Determining that it is a drive other than the DV, the drive identifying part 41 notifies the file reproducing application 13 of information of the selected file through the HDD file starter 42 and starts the file reproducing application 13 so that an operation of "opening" the selected file will be executed. When the drive identifying part 41 judges that it is a DV file, information of the selected file is notified to the DVFS support application 30 through the DV file starter 43, and the DVFS support application 30 executes processing of reproducing and displaying, in real time, DV stream data which are obtainable through the DV driver 24 from the DV 23.

The processing above makes it possible to reproduce and display data in the DV 23 file by file based on an asynchronous random request, even if the DV 23 is capable of only outputting stream data.

Although the foregoing has described that data are video/speech data and the applications are for reproducing and displaying video/speech data according to the present invention, even in the case of data of other types, a similar effect is obtainable using applications which correspond to the other type data.

Third Preferred Embodiment

Figure 3:
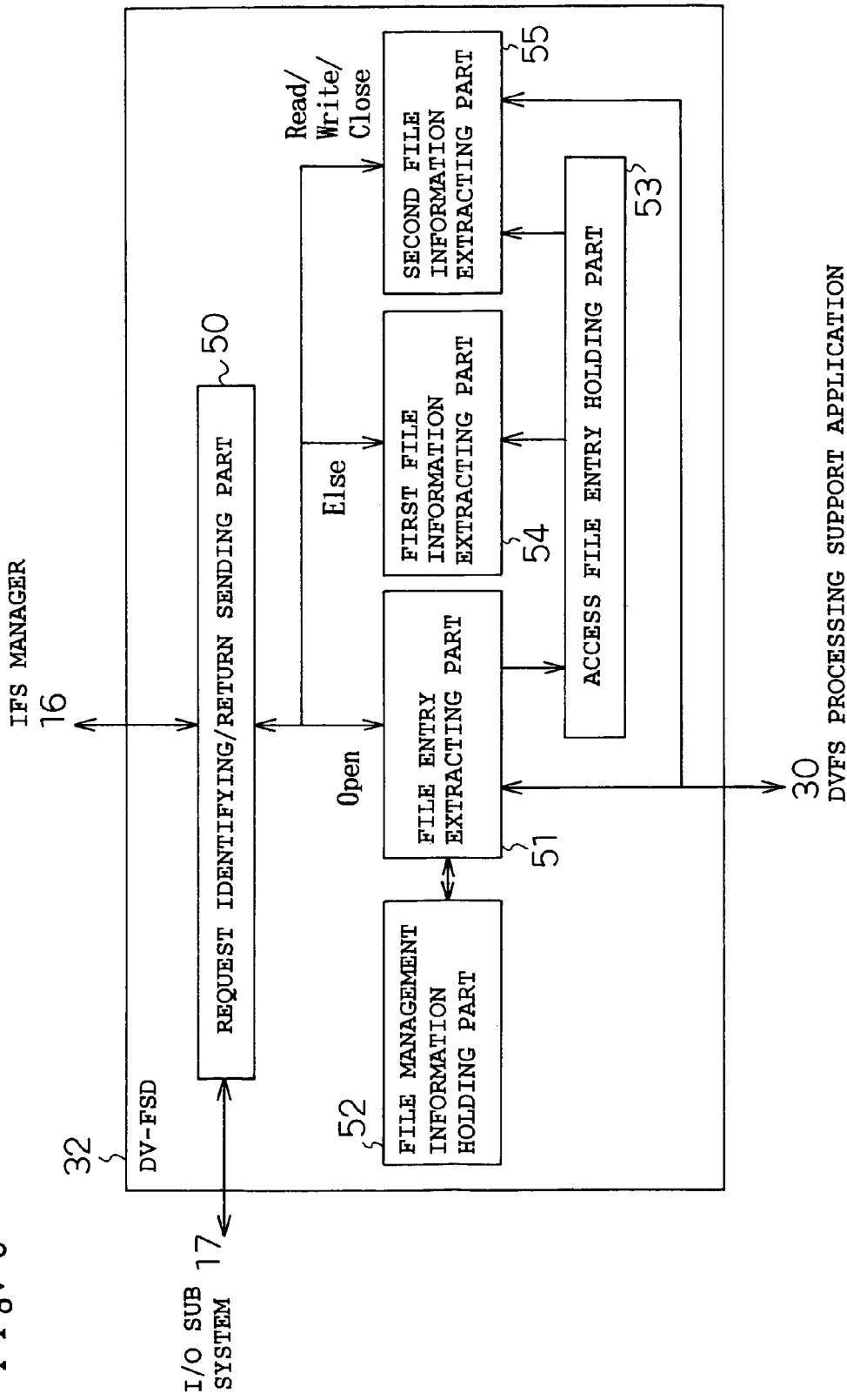
FIG. 3 is a block diagram of an FSD for a DV (used in the first and the second preferred embodiments) which is a third preferred embodiment.

A structure of the DV-FSD 32 which is used in the first and the second preferred embodiments of the present invention will be described with reference to FIG. 3. FIG. 3 is a block diagram of the DV-FSD 32, wherein denoted at 50 is a request identifying/return sending part, denoted at 51 is a file entry extracting part, denoted at 52 is a file management information holding part, denoted at 53 is an access file entry holding part, denoted at 54 is a first file information extracting part, denoted at 55 is a second file information extracting part.

The DV-FSD having such a structure operates in the following manner. The request identifying/return sending part 50, being an interface with the IFS manager 16, receives a request and returns information/data demanded by the request and a return code. Further, the request identifying/return sending part 50 discriminates requests of a plurality of types.

When a request is OPEN, based on a file name received together with the request, the file entry extracting part 51 extracts a file entry which corresponds to the file name from the file management information holding part 52, registers in the access file entry holding part 53, and sends the OPEN request to the DVFS support application 31. OPEN requests are notifications to start processing corresponding files. In general, the system handles a file in accordance with only a file ID and associates a file ID with a file name only when receiving an OPEN request, and therefore, it is necessary for the access file entry holding part 53 to associate a file ID with a file entry. From information held by the file management information holding part 52, in the absence of a file which corresponds to the designated file name, the request identifying/return sending part 50 returns a return code which is indicative of a failure.

When the request is READ or WRITE, the second file information extracting part 55 extracts information regarding the designated file from the access file entry holding part 53 based on the file ID received together with the request, adds such information to the request and sends to the DVFS support application 30. In the case that the DVFS support application 30 determines that copying of a file in the DV 23 to the HDD 20 or copying a file on the HDD 20 to the DV 23 is demanded, data processing in response to the READ or WRITE request is not executed, and instead, the request identifying/return sending part 50 returns a return code which is indicative of a success.

When the request is CLOSE, the second file information extracting part 55 extracts information regarding the designated file from the access file entry holding part 53 based on the file ID received together with the request and sends the request to the DVFS support application 30, and the request identifying/return sending part 50 returns a return code which is indicative of a success.

For a request other than the above, the request needs not be sent to the DVFS support application 30, and therefore, the first file information extracting part 54 extracts information regarding the designated file from the access file entry holding part 53 based on the file ID received together with the request and the request identifying/return sending part 50 sends it together with a success return code to the IFS manager 16.

Owing to the DV-FSD 32 having such a structure described above, even if the DV 23 is capable of only receiving and outputting stream data, it is possible to execute processing file by file based on an asynchronous random request.

Fourth Preferred Embodiment

Figure 4:
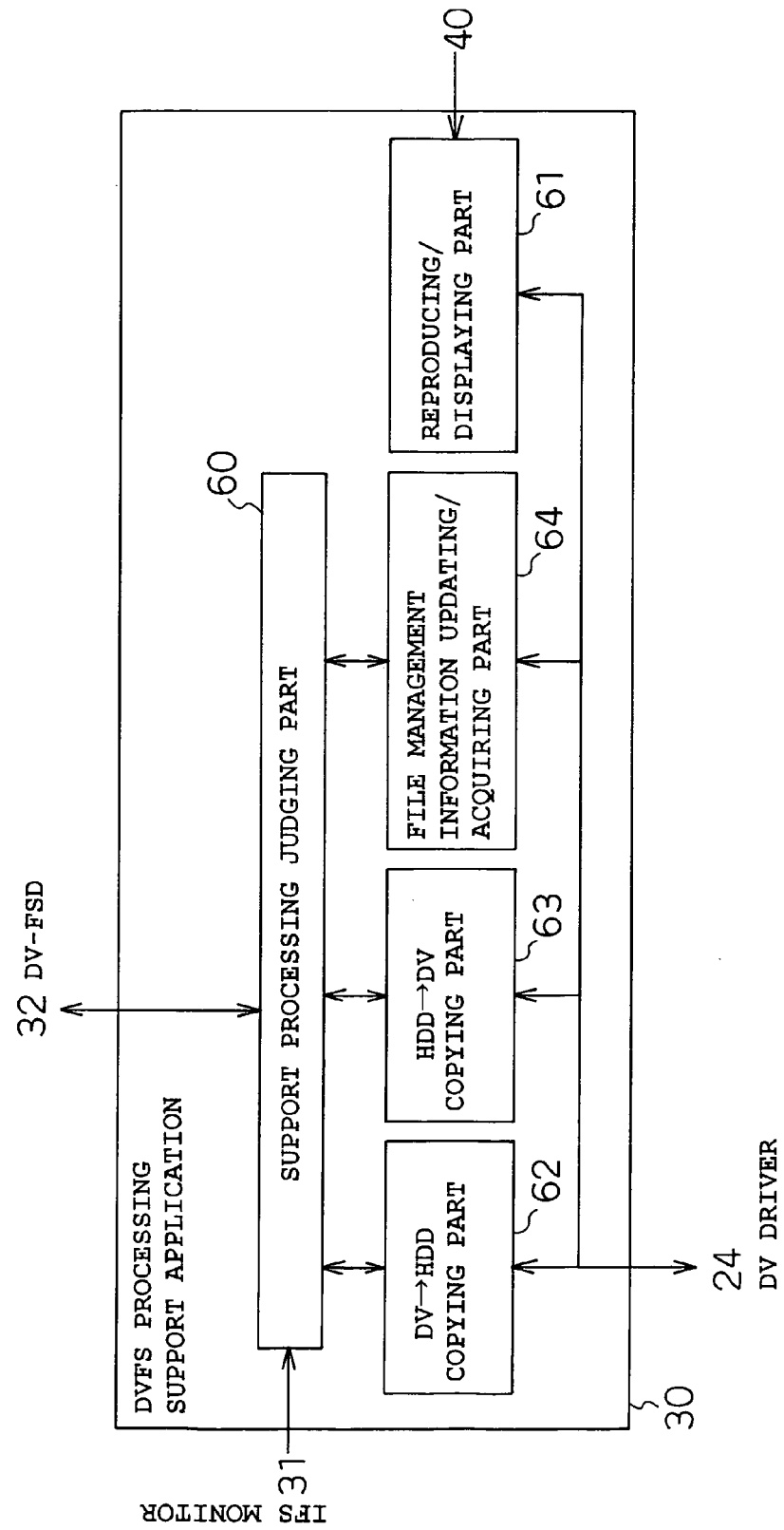
FIG. 4 is a block diagram showing a first structure example of a DVFS processing support application (used in the first and the second preferred embodiments) which is a fourth preferred embodiment.

A structure of the DVFS support application 30 which is used in the first and the second preferred embodiments of the present invention will be described with reference to FIG. 4. FIG. 4 is a block diagram of the DVFS support application 30, wherein denoted at 60 is a support processing judging part, denoted at 61 is a reproducing/displaying part, denoted at 62 is a DV→HDD copying part, denoted at 63 is an HDD→DV copying part, and denoted at 64 is a file management information updating/acquiring part.

The DVFS support application having such a structure operates in the following manner. The support processing judging part 60 judges processing regarding the DV 23 based on a request from the DV-FSD 32 and information from the IFS monitor 31, and instructs to execute appropriate processing.

When instructed to reproduce a file which is recorded on the tape in the DV 23, the reproducing/displaying part 61 is started by the file reproduce/starter application 40 and executes reproducing/displaying processing while working in cooperation with the DV driver 24. More specifically, the following is carried out as a series of operations:

(1) An instruction to search for a front part of a file is sent to the DV 23 through the DV driver 24.

(2) An instruction for reproduction is sent to the DV 23 through the DV driver 24.

(3) Data reproduced by the DV 23 and sent from the DV 23 through the DV driver 24 are displayed.

(4) When a last part of the file is reached, an instruction to stop is sent to the DV 23 through the DV driver 24.

When instructed to copy a file recorded on the tape in the DV 23 to the HDD 20, the DV→HDD copying part 62 is started in accordance with the judgment made by the support processing judging part 60 and executes copying while working in cooperation with the DV driver 24. In short, the following is carried out as a series of operations:

(1) An instruction to search for a front part of a file is sent to the DV 23 through the DV driver 24.

(2) An instruction for reproduction is sent to the DV 23 through the DV driver 24.

(3) Data reproduced by the DV 23 and sent from the DV 23 through the DV driver 24 are written on the HDD 20.

(4) When a last part of the file is reached, an instruction to stop is sent to the DV 23 through the DV driver 24.

When instructed to copy a file on the HDD 20 to a tape in the DV 23, the HDD→DV copying part 63 is started in accordance with the judgment made by the support processing judging part 60 and executes copying while working in cooperation with the DV driver 24. In short, the following is carried out as a series of operations:

(1) An instruction to search for the most recent file recording end position in the tape is sent to the DV 23 through the DV driver 24.

(2) Data to be read from the HDD 20 are sent from the DV 23 through the DV driver 24.

(3) An instruction for recording is sent to the DV 23 through the DV driver 24.

(4) When a last part of the file is reached, an instruction to stop is sent to the DV 23 through the DV driver 24.

Since the support processing judging part 60 instructs the DV→HDD copying part 62 and the HDD→DV copying part 63 to carry out an operation file by file, at least a recording location and the size of the file which are information regarding the file needs be provided together with the instruction for operation. If a file name as well is to be displayed when a message indicating that the processing is ongoing is displayed on a screen, information regarding the file name as well needs be provided.

When the IFS manager 16 and the other parts demand information contained in the file management information, accessing a tape each time takes very long time and imposes a very large burden upon the mechanism of the DV 23 and the tape itself, and hence, it is preferable that the file management information holding part 52 within the file processing system 10 holds such information in advance and the file management information holding part 52 is accessed usually.

Noting this, the file management information updating/acquiring part 64 executes an operation of recording the file management information held by the file management information holding part 52 on a tape or making the file management information holding part 52 acquire the file management information recorded on the tape.

In order to prevent the file recorded on the tape, the file management information recorded on the tape and the file management information held by the file management information holding part 52 from becoming different from each other, it is necessary to record the file management information as well on the tape at least immediately after recording the file on the tape. (When it is known from the beginning that more than one files are to be recorded subsequently, the file management information may be recorded on the tape immediately after recording the last file on the tape.)

Upon start-up of the file processing system 10, it is necessary to acquire the file management information. Further, since the mechanism of the DV does not require the DV driver 24 to transmit this information to the file processing system 10 even despite exchange of a medium, and therefore, it is desirable that the file management information updating/acquiring part 64 has a function of checking whether a medium has been exchanged or not.

With a medium ID included in the file management information, whether the file management information in the file management information holding part 52 and the file management information acquired by the file management information updating/acquiring part 64 are on the same medium can be determined based on a medium ID, and hence, it is possible to judge whether a medium has been exchanged or not.

In addition, with the most recent updating date/time information included in the file management information, which one of the file management information in the file management information holding part 52 and the file management information acquired by the file management information updating/acquiring part 64 is the most recent file management information can be found, which in turn makes it possible to deal with a situation that the two pieces of file management information do not match with each other.

Other than the start-up of the file processing system 10, the timing of acquiring the file management information may be issuance of a particular instruction from the FS displaying application 11, for example (on the condition that the DV driver 24 is not handling data as during copying or reproducing) Alternatively, acquisition may be on a regular basis (on the condition that the DV driver 24 is not handling data as during copying or reproducing).

By means of the DVFS support application 30 which works in cooperation with the DV-FSD 32 having such a structure described above, even if the DV 23 is capable of only receiving and outputting stream data, it is possible to execute processing file by file based on an asynchronous random request.

Although the foregoing has described that the most recent updating date/time information and medium IDs are a part of the file management information, medium IDs may be stored in an auxiliary memory which is attached to a tape. Alternatively, since the values of medium IDs will not be changed once specific values are set with respect to the tape, the medium IDs may be recorded on a label of a package or in an auxiliary data recording area of a track formed on the tape, which enables to quickly acquire these values without searching for the file management information.

In short, the medium IDs may be recorded in any place, such as on the tape, in an auxiliary memory or on a package, as far as they can be acquired by the DV driver 24.

While the foregoing has described the support processing judging part 60 as included in the DVFS support application 30 in relation to the third and the fourth preferred embodiments, a similar effect is obtainable if this function is assigned to the DV-FSD 32 (on the condition that the DV-FSD 32 receives an output from the DVFS support application 30).

Although the foregoing has described a sequence of successful processing, when an error occurs during processing, each means operates in accordance with the error.

Wherever the file management information for the DVFS which the FSD refers to is, may it be on the HDD, in a memory or somewhere on the tape, the present invention remains applicable. If the system is for handling a plurality of tapes in the same PC, with medium IDs which associate the tapes with the file management information registered in the file management information, the management information needs not be recorded on the tapes.

Further, where the file management information is to be recorded on a tape, the system may be such a system that keeps the information uploaded on the HDD or in a memory and access to the HDD or memory in reality.

It is also possible to handle general data, not only video and speech data, in a similar fashion.

Each processing of operation is merely an example, and thus, may include a function of ±fast forwarding, ±slow or the like in addition to regular reproducing operations such as search→reproduce→stop.

Fifth Preferred Embodiment

Figure 5:
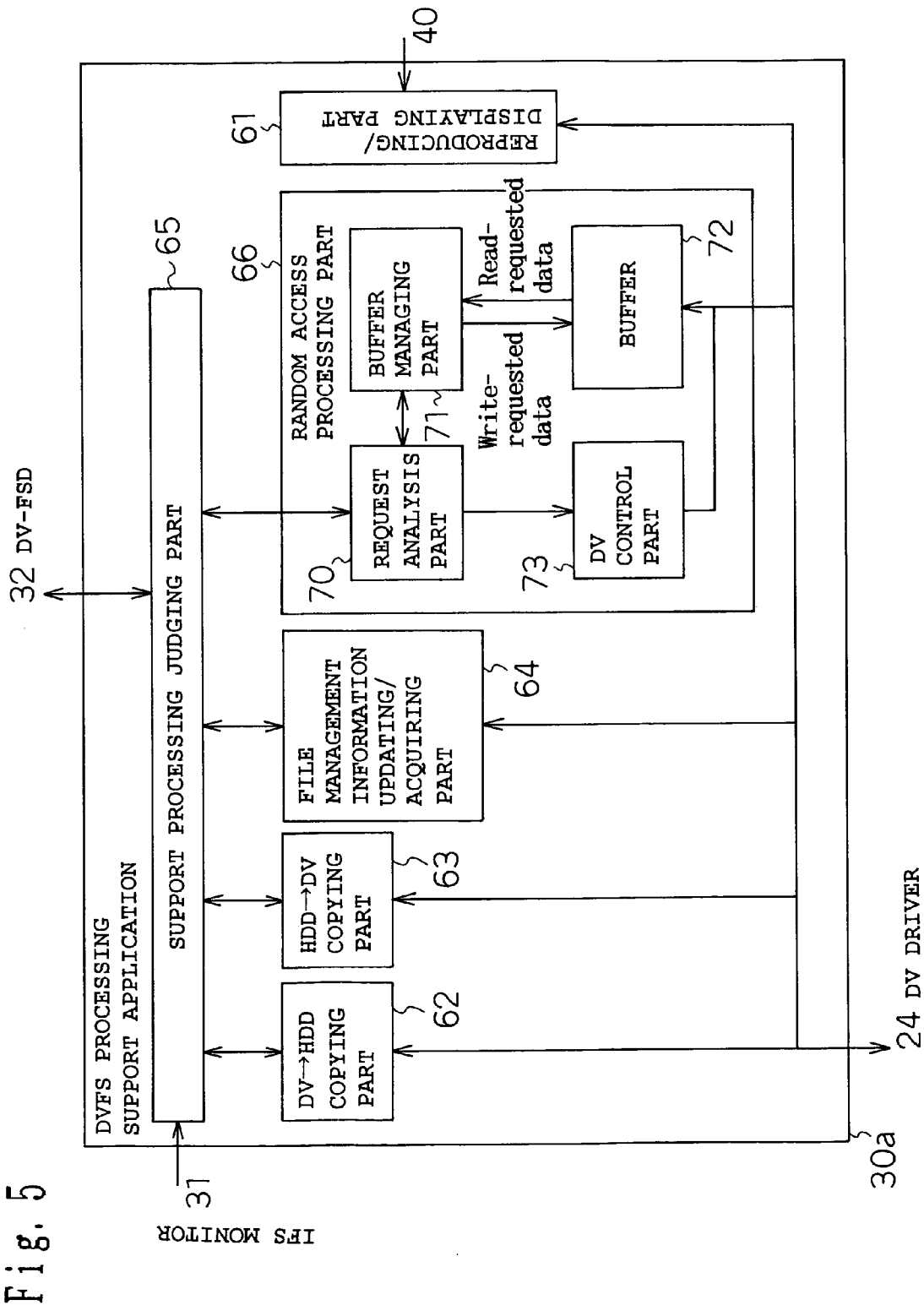
FIG. 5 is a block diagram showing a second structure example of a DVFS processing support application (used in the first and the second preferred embodiments) which is a fifth preferred embodiment.

A second structure example of the DVFS support application which is used in the first and the second preferred embodiments of the present invention will be described with reference to FIG. 5. FIG. 5 is a block diagram of a DVFS support application 30a, wherein denoted at 65 is a support processing judging part, denoted at 61 is a reproducing/displaying part, denoted at 62 is a DV→HDD copying part, denoted at 63 is an HDD→DV copying part, denoted at 64 is a file management information updating/acquiring part, denoted at 66 is a random access processing part, denoted at 70 is a request analysis part, denoted at 71 is a buffer managing part, denoted at 72 is a buffer, and denoted at 73 is a DV control part. The reproducing/displaying part 61, the DV→HDD copying part 62, the HDD→DV copying part 63 and the file management information updating/acquiring part 64 are the same as those of the fourth preferred embodiment. The support processing judging part 65 has a random access function in addition to the function of the support processing judging part 60 of the fourth preferred embodiment.

The support processing judging part 65 feeds the random access processing part 66 with an OPEN-Request, a READ-Request, a WRITE-Request and a CLOSE-Request directed to the DV 23 other than a request which is determined as copying processing from the DV 23 to the HDD 20 and a request which is determined as copying processing from the HDD 20 to the DV 23. When feeding with an OPEN-Request or a CLOSE-Request, the support processing judging part 65 provides information regarding a designated file as well together with the request. When feeding with a READ-Request, the support processing judging part 65 provides, together with a designated manner of returning requested data, information which designates which portion of the file is requested, in addition to information regarding a recording location and the size of the designated file on the tape.

When feeding with a WRITE-Request, the support processing judging part 65 provides, together with requested data, information which designates which portion of the file is requested, in addition to information regarding a recording location and the size of the designated file on the tape. The requested data are designated by means of an offset byte count from the beginning of the file and a byte size of the requested data, both in the case of READ and WRITE.

In the random access processing part 66, first, the request analysis part 70 identifies a request.

When the request is a READ-Request, from the recording location of the file on the tape and an offset byte count from the beginning of the file, the request analysis part 70 confirms which portion on the tape bears the requested data. The buffer managing part 71 confirms whether the requested data are in the buffer 72 or not. When the requested data are not in the buffer 72, the DV control part 73 sends to the DV 23 through the DV driver 24 an instruction for an operation of searching for a portion which bears the requested data, sends an instruction for reproduction to the DV 23 through the DV driver 24, and writes in the buffer 72 data which are reproduced by the DV 23 and received through the DV driver 24.

Meanwhile, the buffer managing part 71 transfers the requested data to the support processing judging part 65 from the buffer 72 via the request analysis part 70.

When the request is a WRITE-Request, from the recording location of the file on the tape and an offset byte count from the beginning of the file, the request analysis part 70 confirms which portion on the tape should bear the requested data, and more specifically, how many bytes should be written from which byte in which frame. The buffer managing part 71 confirms whether the requested data are in the buffer 72 or not.

When the requested data are not in the buffer 72, the DV control part 73 sends to the DV 23 through the DV driver 24 an instruction for an operation of searching for a portion which should be bearing the requested data, sends an instruction for reproduction to the DV 23 through the DV driver 24, and writes in the buffer 72 data which are reproduced by the DV 23 and received through the DV driver 24. The buffer managing part 71 writes the data demanded by the WRITE-Request over data which are in the buffer 72, sends at least re-written frame data on the buffer 72 to the DV 23 through the DV driver 24, and over-writes in a designated portion on the tape which is in the DV 23.

While recording to the DV 23 proceeds frame by frame, since a WRITE-Request designates in the unit of bytes to write from somewhere in a frame, the procedure above is necessary. However, when the buffer managing part 71 determines from the processing up to that stage that necessary data are in the buffer 72, it is not necessary to reproduce data from the DV 23.

The structure described above makes it possible to deal with not only particular applications but general applications as well (such as real-time reproduction/displaying and copying) even if the DV 23 is capable of only receiving and outputting stream data, and therefore it is possible to appropriately deal with the particular applications and the general applications respectively.

Since a tape is a sequential medium, for the purpose of reproducing a file of video/speech data for instance in real time, one file must be recorded in continuous areas on a tape. When a file is to be over-written, as over-writing takes place on a medium, if a size exceeds that of a file as it is before over-writing, recording becomes impossible. Hence, it is necessary to execute appended-recording during an over-write save as well not only during a save of a new file.

In the case of a tape formatted in advance, similar processing to that for a WRITE-Request described above may be executed. In the case of a tape not formatted in which there is a frame bearing no record before a frame to record in, a dummy frame needs be recorded. Conversely, where a WRITE-Request has a precondition that data are specified in a sequential order starting with data at the beginning of a file, processing of reproducing data first in the buffer 72 from the DV 23 is not necessary.

Further, although the foregoing has described that data to be transmitted are DV data, data to be transmitted may be other data.

Further, although the foregoing has described that an I/F is an IEEE1394 interface, other I/F may be used.

Further, a receiving apparatus may be realized by software and/or hardware.

Sixth Preferred Embodiment

Next, a sixth preferred embodiment of the present invention will be described with reference to FIG. 6.

Figure 6:
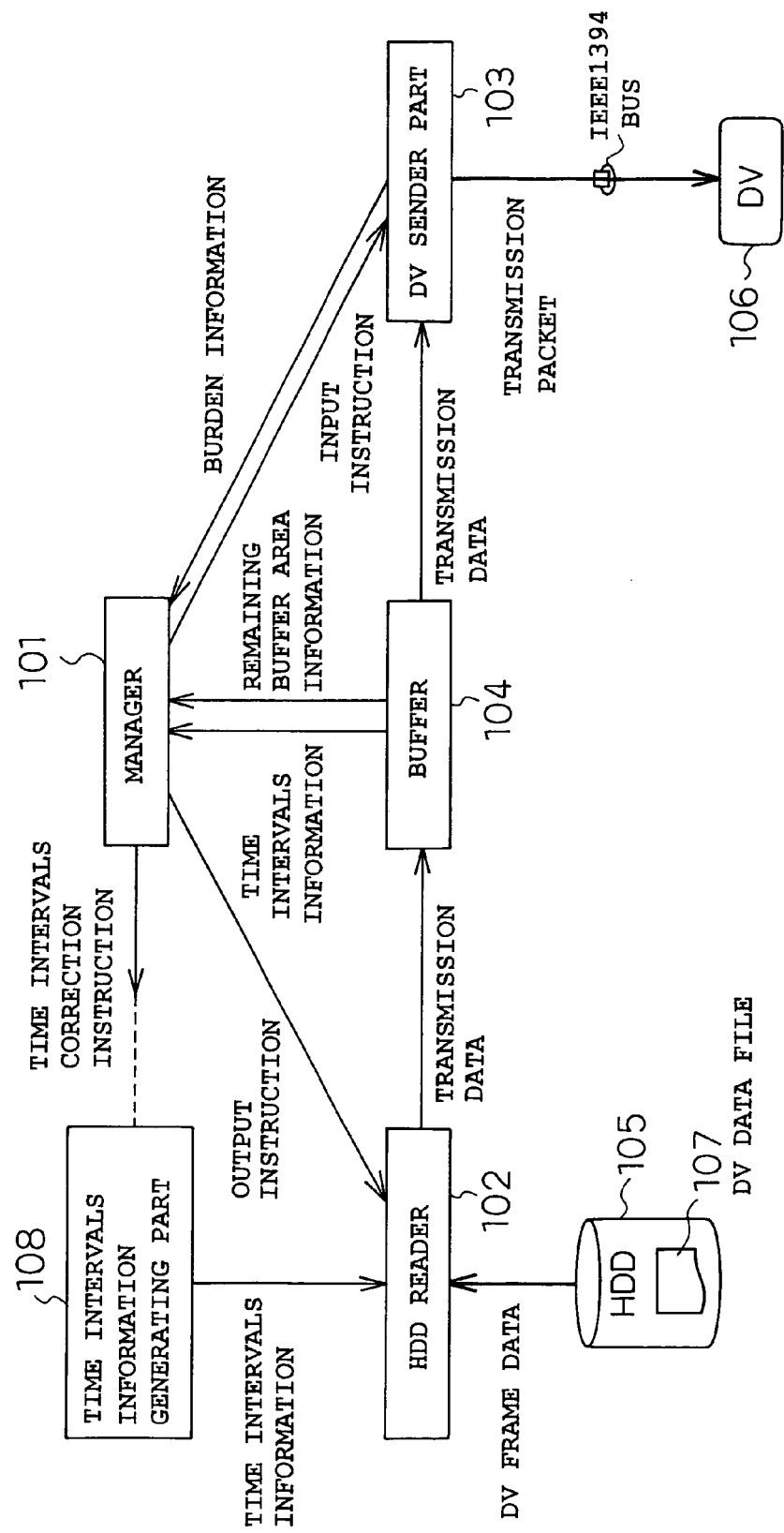
FIG. 6 is a block diagram of a data transmission apparatus according to a sixth preferred embodiment.

FIG. 6 is a block diagram of a data transmission apparatus. In FIG. 6, denoted at 101 is a manager, denoted at 102 is an HDD reader part, denoted at 103 is a DV sender part, denoted at 104 is a buffer, denoted at 105 is an HDD, denoted at 106 is a DV, denoted at 107 is a DV data file, and denoted at 108 is a time intervals information generating part.

The following assumes that the DV data file 107 is formed by video data of the NTSC system.

As transmission starts, first, the manager 101 sends an output instruction to the HDD reader part 102. Receiving the output instruction, the HDD reader part 102 reads frame data from the DV data file 107 recorded on the HDD 105, adds time intervals information generated by the time intervals information generating part 108 to this, and writes in the buffer 104 as transmission data. The time intervals information indicates the time of day to start processing frame data in the DV sender part 103 and the time of day to end processing frame data in the DV sender part 103.

Further, the manager 101 sends an input instruction to the DV sender part 103 based on the time intervals information written in the buffer 104, and when a free space is created in the buffer 104, the manager 101 sends the next output instruction to the HDD reader part 102 based on remaining area information regarding the buffer 104.

That is, the input instruction is sent to the DV sender part 103 such that the DV sender part 103 starts inputting frame data during an occupation period which is indicated by the time intervals information written in the buffer 104 and completes inputting the frame data. Receiving the input instruction, the DV sender part 103 reads the transmission data from the buffer 104, converts it into a transmission packet, and outputs it to the DV 106 via an IEEE1394 bus.

This is repeated, thereby transmitting data in the DV data file 107.

When a processing time of frame data becomes uneven because of other processing executed simultaneously by the PC or for other reason and actual processing becomes too slow, the time of day designated by the time intervals information becomes different from the actual time of day of processing. To reduce such a difference, the manager 101 creates a time intervals correction instruction based on load information regarding the DV sender part 103 and the time intervals information, and sends it to the time intervals information generating part 108.

For example, it is assumed that since a frame frequency of video data of the NTSC system is 30/1.001 (÷29.97) Hz, an occupation period of frame data is initially set to 0.033 sec. In response, the time intervals information regarding the 0-th frame data holds (the start time, the end time)=(0, 0.033). If the processing in the DV sender part 103 takes long, the manager 101 sends a time intervals correction instruction to the time intervals information generating part 108 so as to extend the occupation period of frame data.

However, for the purpose of maintaining frame intervals, the time intervals information generating part 108 does not receive the time intervals correction instruction sent from the manager 101 or receives but ignores it, and so that values shown in FIG. 7 are used as the time intervals information corresponding to frame data which bear a frame number n. In other words, the start time is n*1.001/30 sec, and the end time is (n+1)*1.001/30 sec.

By means of the time intervals information generating part 108 having such a structure described above, frame data are supplied to the DV sender part 103 while maintaining the frame frequency intervals approximately, and as the data are converted into a predetermined packet and sent to the DV 106 in this condition, stable sending to the DV 106 is realized.

Although the start time is n*1.001/30 sec and the end time is (n+1)*1.001/30 sec in the foregoing, values close to these, such as these values with their fractions rounded off, may be used.

Further, although the foregoing has described that the DV data file 107 is formed by video data of the NTSC system, the DV data file 107 may be formed by other video data of a different method such as the PAL method or other stream data such as MPEG data.

Further, although the foregoing has described that the time intervals information according to this embodiment is set to define that the start time is n*1.001/30 sec and the end time is (n+1)*1.001/30 sec, this is not limiting. When the DV data file 107 is video data of other method except for the NTSC system or other stream such as MPEG data, the time intervals information may be determined based on the other method, a frame frequency of the stream, etc. In short, the time intervals information only needs be set so as to correspond to the timing which is needed by an apparatus which receives packet data of the data frame, such as the DV 106.

Further, although the foregoing has described that the manager 101 sends an input instruction to the DV sender part 103 based on the time intervals information written in the buffer 104, this is not limiting. The manager 101 may send an input instruction to the DV sender part 103 based on the time intervals information written in the buffer 104 and burden information regarding the DV sender part 103. In this case, the manager 101 fine-tunes the processing that the DV sender part 103 reads transmission data from the buffer 104 based on the burden information regarding the DV sender part 103. One example of a fine-tuning operation by the manager 103 (101 ???) will be described below.

For instance, when the DV sender part 103 can not read transmission data from the buffer 104 temporarily because of other processing executed simultaneously by the PC so that the DV sender part 103 can be destroyed if the manager 101 sends an input instruction to the DV sender part 103, the manager 103 learns from the burden information that the DV sender part 103 can not accept an input instruction and temporarily postpones sending of an input instruction to the DV sender part 103. As the DV sender part 103 becomes capable of normally accepting an input instruction, the manager 103 sends the postponed input instruction to the DV sender part 103. Further, to make up for the delay in the processing of the transmission data, time intervals for sending an input instruction are decreased. In this manner, the manager 101, considering not only the time intervals information but the burden information as well, sends the input instruction to the DV sender part 103 in such a manner that the processing completes during an occupation period which is indicated by the time intervals information while making sure that the DV sender part 103 will not break down. In this manner, the manager 103 may fine-tune the DV sender part 103 while considering not only the time intervals information but the burden information as well to ensure that the processing at the DV sender part 103 will not break down.

Further, although the foregoing has described that the manager 101 creates a correction instruction for correcting the time intervals information based on the burden information regarding the DV sender part 103 and the time intervals information and sends it to the time intervals information generating part 108 according to this embodiment, this is not limiting. The manager 101 may not create a correction instruction for correcting the time intervals information. Hence, the manager 101 does not send correction information to the time intervals information generating part 108. In this manner, an effect equivalent to that according to this embodiment is obtainable, and it is possible to realize a data transmission apparatus having a simpler structure.

Further, the time of day information according to the present invention is not limited to express, in the DV sender part 103, the time at which processing of frame data should start and the time at which the processing should end as in the case of the time intervals information according to this embodiment, but may express only the time at which processing of frame data should start. In this case, the time at which processing of the next frame data should start may be the time at which the ongoing processing of the current frame data should end.

Further, the data transmission apparatus may be formed by hardware or software, or the both.

Further, the time intervals information generating means 108 according to this embodiment is an example of the time intervals information generating part according to the present invention, the HDD reader part 102 according to this embodiment is an example of the outputting means according to the present invention, the DV sender part 103 according to this embodiment is an example of the sending means according to the present invention, the manager 101 according to this embodiment is an example of the transmission managing means according to the present invention. In addition, the time of day information according to this embodiment is an example of the time intervals information according to the present invention.

Further, the manager 101 according to this embodiment may be a part of DirectShow which manages data transmission, or a data transmission-managing portion of application software which can be handle stream data, such as video/speech data, on a PC.

Further, the data transmission apparatus may be a data transmission apparatus which executes transmission of other types of data, such as to reproduce and display a DV data file, using a DV reproducing part instead of the DV sender part 103.

According to this embodiment, fluctuations in transmission of frame data are reduced so that it is possible to transmit stream data in a stable manner.

Seventh Preferred Embodiment

Next, a seventh preferred embodiment of the present invention will be described with reference to FIG. 8.

Figure 8:
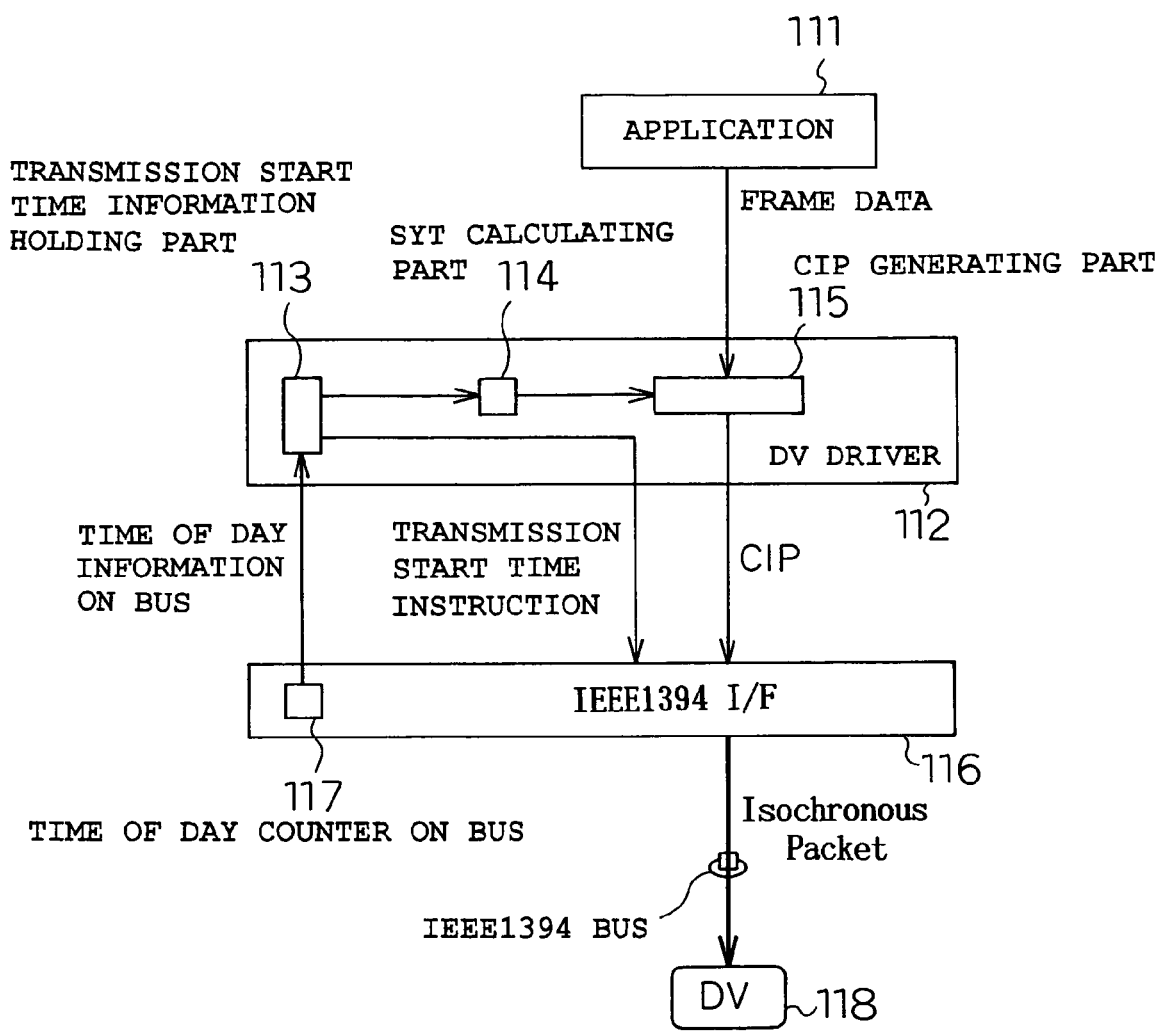
FIG. 8 is a block diagram of a data transmission apparatus according to a seventh preferred embodiment.

FIG. 8 shows an example of a data transmission apparatus according to the seventh preferred embodiment of the present invention. In FIG. 8, denoted at 111 is an application, denoted at 112 is a DV driver, denoted at 113 is the transmission start time information holding part, denoted at 114 is an SYT calculating part, denoted at 115 is a CIP generating part, denoted at 116 is at IEEE1394 I/F, denoted at 117 is a time counter on a bus, and denoted at 118 is a DV.

Further, FIG. 9 is an explanatory diagram showing a structure of DV frame data. As shown in FIG. 9(*a*), DV data expressing video of the NTSC system consists of 1500 DIF blocks having the length of 80 bytes. A CIP (Common Isochronous Packet) shown in FIG. 9(*b*) is collection of data which can be transmitted in one IEEE1394 cycle, and is formed by six DIF blocks and a CIP header. The last two bytes of the CIP header are information called "SYT" which expresses the time at which the DV 118 starts processing after receiving data using the lower two bytes of a time counter according to IEEE1394 shown in FIG. 9 (*d*). However, FFFFh may be substituted in an SYT area in the CIP except for at the beginning of a frame. It is an isochronous packet as that shown in FIG. 9(*c*) that is actually transmitted, and the isochronous packet is formed by further adding a packet header, a header_CRC and a data_CRC to the CIP.

A time in IEEE1394 is formed by three types of counters called a "second_count," a "cycle_count" and "cycle_offset" as shown in FIG. 9(*d*). The second_count has a width of seven bits and circulates among values from 0 to 127, and the count unit is one second. The cycle_count has a width of thirteen bits and circulates among values from 0 to 7999, and the count unit is 125 microseconds. The cycle_count has a width of twelve bits and circulates among values from 0 to 3071, and the count unit is 1/24576000 second.

The transmission processing is executed in the following manner. The application 111 outputs one frame of DV data to the DV driver 112 as frame data. The DV driver 112 divides the received frame data for the six DIF blocks, adds the CIP header and converts into a CIP, and outputs it to the IEEE1394 I/F 116. The IEEE1394 I/F 116 adds a packet header, a header_CRC and a data_CRC to the CIP received from the DV driver 112 to converts into an isochronous packet, and outputs to the DV 118.

Figure 10:
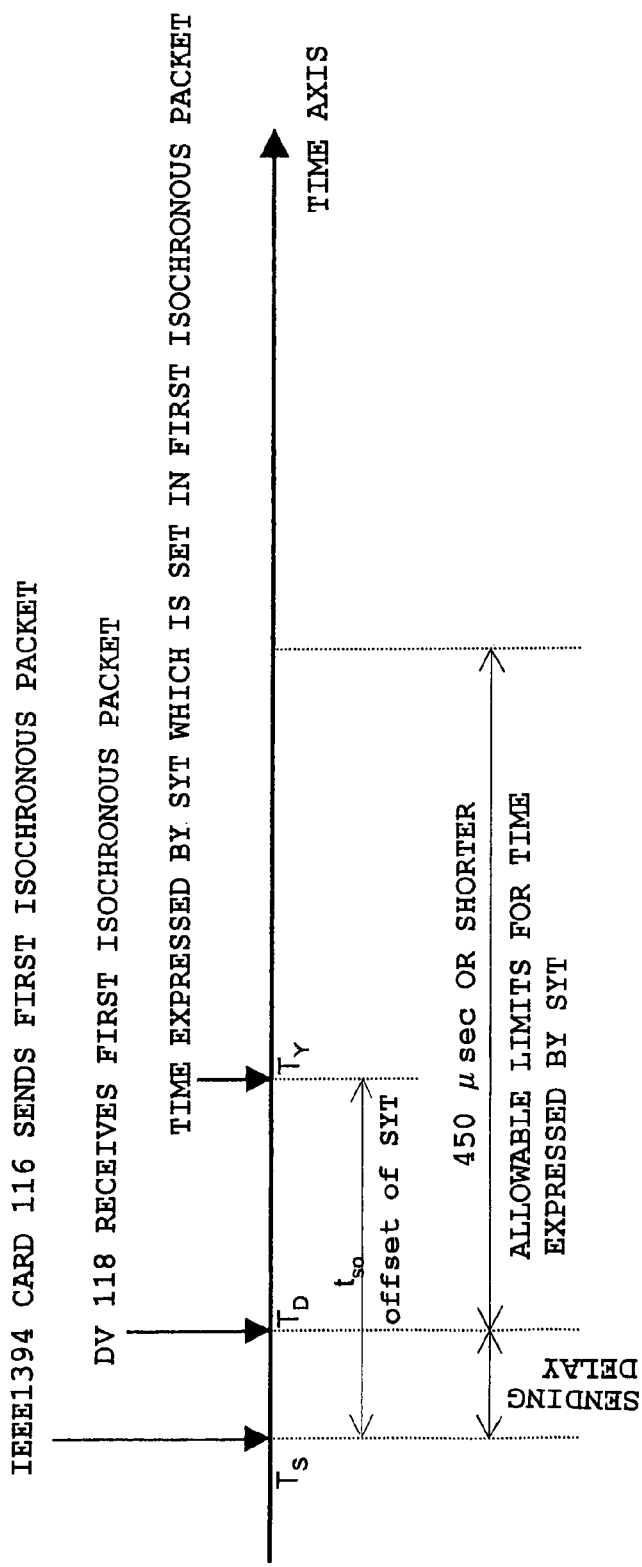
FIG. 10 is a timing chart showing the timing of sending and receiving isochronous packets on an IEEE1394 bus.

FIG. 10 is a timing chart showing the timing of sending and receiving isochronous packets. The condition for the DV 118 to receive an isochronous packet and process normally inside is:

(1) The time TY designated by the SYT of the isochronous packet is after the time TD at which the DV 118 has received the isochronous packet; and (2) A difference between the time TY designated by the SYT of the isochronous packet and the time TD at which the DV 118 has received the isochronous packet is 450 microseconds or less. That is, the difference must be TD<TY<TD+450 microseconds.

To satisfy the condition above, the transmission start time information holding part 113 acquires the time of day information on the bus from the time counter on the bus which is in the IEEE1394 I/F 116, sets and holds the transmission start time TS based on the acquired time, and sends an instruction regarding the transmission start time for the entire stream data to the IEEE1394 I/F 116. The SYT calculating part 114 calculates the SYT for each frame based on the transmission start time TS set by the transmission start time information holding part 113, and the CIP generating part 115 creates a CIP of a predetermined format.

FIG. 11 shows a method of calculating the SYT. Considering that a sending delay is a few dozens of microseconds or shorter and considering the relationship described above between TY and TD, an offset tso from TS of the time TY designated by the SYT of an isochronous packet which is at the beginning of stream data to be transmitted is set to 250 microseconds. As to the following frames, since this example is on a video signal of the NTSC system, the SYT is incremented by 1.001/30 second each time. In this manner, it is possible to provide an SYT which meets the condition above regarding all isochronous packets which are to be transmitted. If a calculated result has fractions, the fractions are rounded off. The SYT values correspond to an example where TS=0 microsecond holds.

Figure 12:
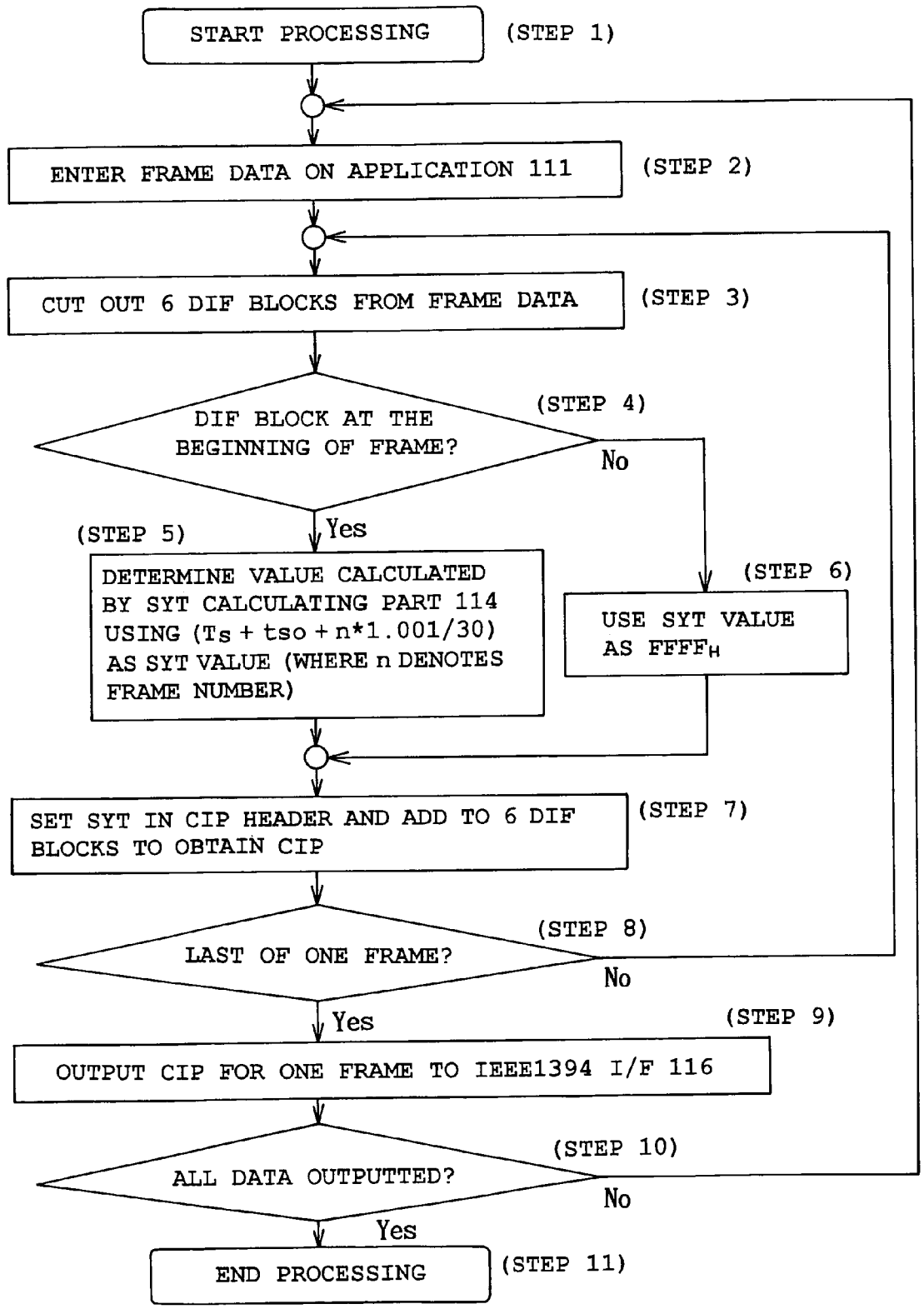
FIG. 12 is a flow chart showing an example of operations of a CIP generating part 115.

FIG. 12 is a flowchart showing an example of operations of the CIP generating part 115. Now, a content of operations of the CIP generating part 115 will be described with reference to FIG. 12.

After starting processing (Step 1), one frame of data are entered via the application 111 (Step 2), and frame data are partitioned into six DIF blocks from the beginning of the data (Step 3). Whether this is a DIF block at the beginning of the frame is judged (Step 4), and if this is at the beginning, a value calculated by the SYT calculating part 114 based on the frame number n (The number n is counted from 0.) is used as an SYT value (Step 5), but if this is at the beginning, the SYT value is used as FFFFH (Step 6). The SYT is set in a CIP header and added to the six DIF blocks, whereby a CIP is created (Step 7). After repeating the processing from Step 3 to Step 7 for one frame, the processing of each frame is terminated in accordance with a judgment at (Step 8), and a CIP for one frame is outputted to the IEEE1394 I/F 116 (Step 9). After repeating the processing from Step 2 to Step 9 for all data, the processing is terminated in accordance with a judgment at (Step 10) (Step 11).

Where a DV driver IEEE1394 I/F is entirely or partially realized by software for PC, because of a varying delay developed during acquisition of the time of day information on the bus indicated by the counter 117 on the bus, it has been heretofore difficult to calculate an accurate SYT value in a DV driver. In addition, a delay develops in the transmission start time as well, which gives rise to a situation that the receiving side can not receive a transmitted isochronous packet.

In contrast, since the DV driver 112 calculates an SYT as described above, it is possible to set, in all SYT, such values which enables the DV 118 to process frame data without fail, and hence, send data.

While the offset tso is 250 microseconds according to the above, the offset tso may be a value around this.

Further, although the foregoing has described that the transmission start time TS is set based on a value of the time of day information on the bus acquired by the transmission start time information holding part 113 from the counter 117 on the bus, depending on the accuracy of the transmission start time which can be designated for the IEEE1394 I/F 116, a fixed value may be used, in which case it is not necessary to acquire a value of the time of day information on the bus. For instance, if the mechanism is such a mechanism which can designate only the lower sixteen bits of the counter 117 on the bus, since it is not possible to delay the transmission start time sixteen cycles or more and time intervals remain almost unchanged in reality until the transmission start time to the DV 118, it is not necessary to confirm the time of day information on the bus.

Further, although the foregoing has described that frame data 708 are DV data which include video of the NTSC system, the frame data may be other stream data such as PAL video.

Further, although the foregoing has described that fractions resulting from calculation of SYT values are rounded off, fractions may be handled by a different fashion, such as counting fractions as one.

Further, the data transmission apparatus may be formed by hardware or software, or the both.

Further, the DV driver 112 according to this embodiment is an example of the data conversion means according to the present invention, and the IEEE1394 I/F 116 according to this embodiment is an example of the interface according to the present invention. In addition, the transmission start time TS according to this embodiment is an example of the transmission start time X for the first packet of the first frame according to the present invention, the offset tso according to this embodiment is an example of the initial value Z according to the present invention, and 1.001/30 second according to this embodiment is an example of the frame cycle Y according to the present invention.

According to this embodiment, since the transmission start time is constant and the processing start time is calculated using this value and the frame number, it is possible to transmit data in such a fashion which allows reception and processing without fail.

Eighth Preferred Embodiment

With respect to transmission of AV data on an IEEE1394 I/F, a transmission system which requires, from the viewpoint of copyright protection, to superimpose copyright information upon a packet header of an isochronous packet was proposed in "5C Digital Transmission Content Protection White Paper" in July, 1998. Based on this copyright information, it is possible to determine whether received data are available for copying or not. Where data are encoded, key information which is necessary for a person at the receiving end to correctly decipher a code is transmitted separately through asynchronous transmission.

A method for transmitting a transport packet (TS packet) of MPEG2 on IEEE 1394 will be described with reference to FIG. 18. As shown in FIG. 18(*a*), a TS packet itself has a length of 188 bytes, and a sync byte having a fixed pattern (47H) of one byte is added to MPEG2 data of 187 bytes. A source packet header is added to this TS packet, whereby a data packet is formed. A time stamp of 25 bits is set in the source packet header. The remaining seven bits are reserved. The time stamp is time of day information which indicates the timing of transmitting the TS packet. One data packet is divided or a plurality of data packets are combined with each other based on a transmission rate regarding data to be transmitted, thereby creating data blocks. A data packet is divided when the transmission rate is low (The number of divisions can be selected from 1, 2 and 4.), whereas when the transmission rate is high, a plurality of data packets are combined with each other (The number of combinations can be selected from 1 through 5.).

As shown in FIG. 18(*b*), a CIP header is added to such a data packet as described above, whereby a CIP (Common Isochronous Packet) is created. Divide/combine information regarding how data packets and data blocks above are divided or combined can be set in the CIP header.

As shown in FIG. 18(*c*), a packet header, a header_CRC and a data_CRC are added to the CIP, whereby an isochronous packet is formed.

As shown in FIG. 18(*d*), the last four bits in the packet header are an area called an "SY area," and when copyright information is to be transmitted together with data, the copyright information is assigned to this. The details of the copyright information are EMI_flag of two bits and O/E_flag of one bit, and the remaining one bit is reserved. The EMI_flag is information which indicates whether copying is allowed, while the O/E_flag is information for normal deciphering which is used when transmission data are encoded.

On the other hand, DirectShow available from Microsoft Corporation which is used in a PC which uses Windows98 OS available from Microsoft Corporation provides an environment for handling stream data, such as video/speech data, on a PC, and an application must handle video/speech data of a recording apparatus or sending/receiving apparatus through the mechanism of DirectShow. However, DirectShow is characterized in that when two or more types of data are transmitted, the respective data transmissions work independently of each other, and therefore, it is necessary to ensure synchronization regarding which copyright information is set for which portion of video data and which portion of speech data.

Now, an eighth preferred embodiment of the present invention will be described with reference to FIG. 13.

Figure 13:
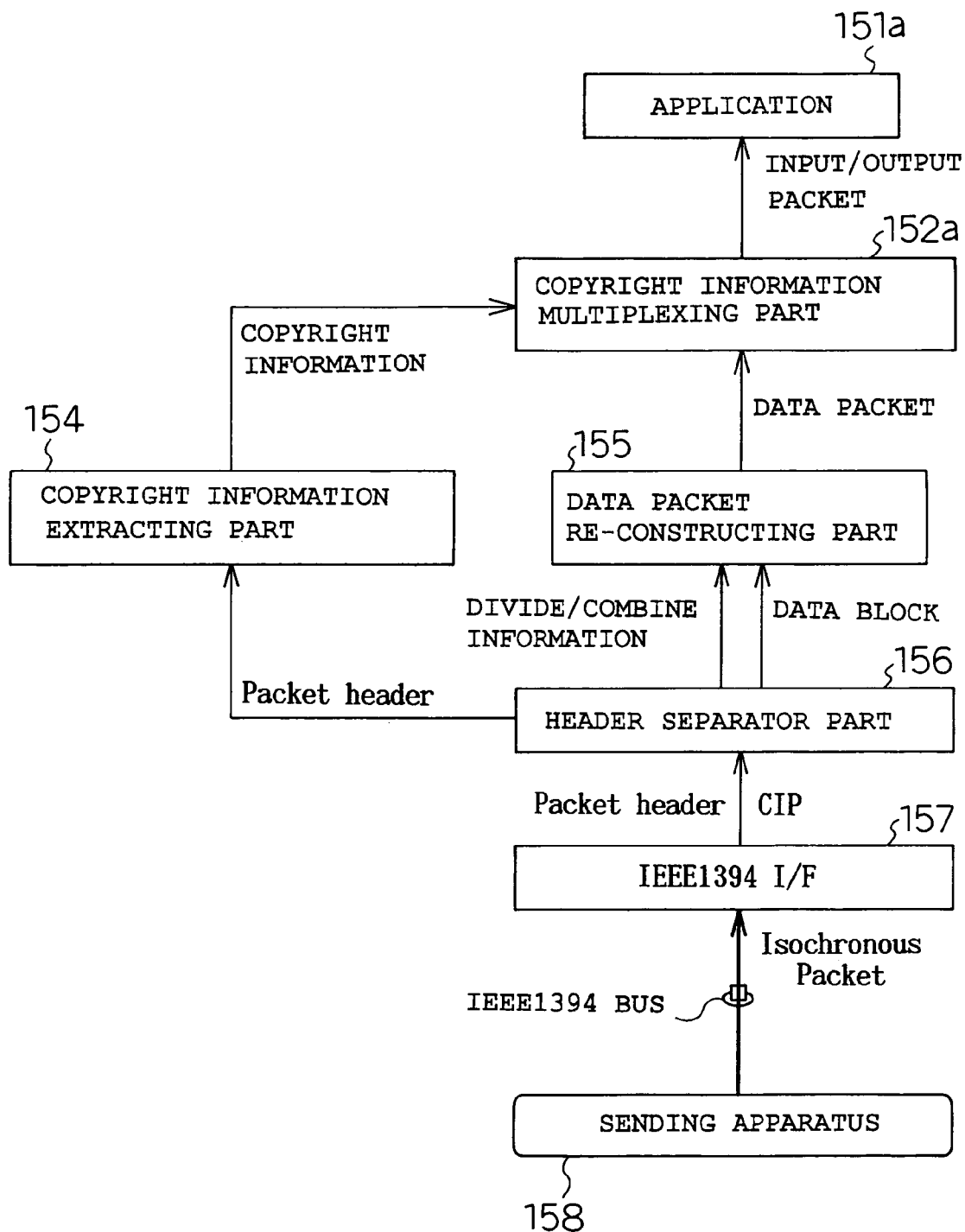
FIG. 13 is a block diagram of a receiving apparatus according to an eighth preferred embodiment.

FIG. 13 shows an example of a receiving apparatus, wherein denoted at 151*a* is an application, denoted at 152*a* is a copyright information multiplexing part, denoted at 154 is a copyright information extracting part, denoted at 155 is a data packet re-constructing part, denoted at 156 is a header separator part, and denoted at 157 is an IEEE1394 I/F. The receiving apparatus according to the eighth preferred embodiment is connected with a sending apparatus 158 via an IEEE1394 bus.

First, the IEEE1394 I/F 157 receives an isochronous packet sent from the sending apparatus 158 which is connected with the IEEE1394 I/F 157, and the packet is divided into a packet header and a CIP and outputted to the header separator part 156.

The header separator part 156 retrieves a data block and divide/combine information from the received CIP and outputs them to the data packet re-constructing part 155, while at the same time outputting the received header to the copyright information multiplexing part 154.

The data packet re-constructing part 155 restores a data packet from the data block based on the received divide/combine information, and outputs it to the copyright information multiplexing part 152*a*.

The copyright information multiplexing part 154 retrieves copyright information from an SY area of the received packet header, and outputs it to the copyright information multiplexing part 152*a*.

The copyright information multiplexing part 152*a* creates an input/output packet in which the copyright information is superimposed on a reserved area of the data packet as shown in FIG. 17(*a*), and outputs the generated input/output packet to the application 151*a*.

As described above, according to this embodiment, since copyright information is superimposed on a reserved area of a packet header, it is possible to output both data and the copyright information to the application 151*a* at the same time.

Although this embodiment requires to superimpose copyright information in a reserved area, copyright information may be written in other place. For example, as shown in FIG. 17(*b*), since a sync byte of an TS packet has a fixed value, the original value can be obtained easily even after written over with copyright information, and therefore, superimposing in this area is possible. Alternatively, as shown in FIG. 17(*c*), a similar effect is obtainable when an area for writing in copyright information is added.

Further, although the foregoing has described that copyright information and MPEG2 data are handled simultaneously, the present invention is applicable to other information as well except for copyright information. However such information is set in an isochronous packet, the present invention remains applicable.

Further, although the foregoing has described that data to be transmitted are MPEG2 data, data to be transmitted may be other data. For instance, an IEEE1394 I/F can send and receive DV data as well by the same protocol as when handling MPEG2 data. Thus, the present invention is applicable even to DV data.

Further, although the foregoing has described that the interface is an IEEE1394 I/F, other interface may be used.

Further, the receiving apparatus may be realized by software and/or hardware.

Ninth Preferred Embodiment

Next, an eighth preferred embodiment of the present invention will be described with reference to FIG. 14.

Figure 14:
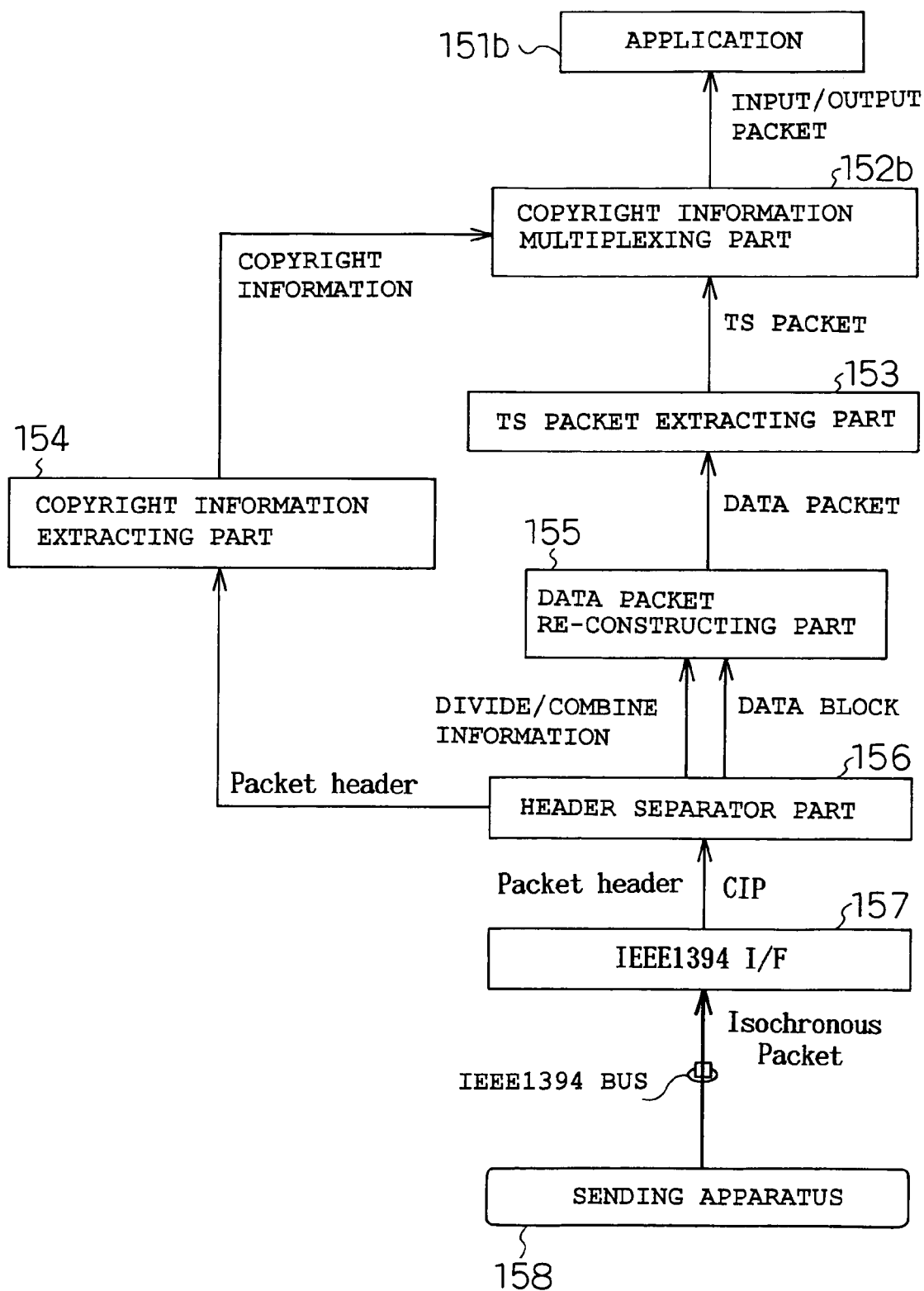
FIG. 14 is a block diagram of a receiving apparatus according to a ninth preferred embodiment.

FIG. 14 shows an example of a receiving apparatus, wherein denoted at 151b is an application, denoted at 152b is a copyright information multiplexing part, denoted at 153 is a data packet re-constructing part (TS packet extracting part ???), denoted at 154 is a copyright information extracting part, denoted at 155 is a data packet re-constructing part, denoted at 156 is a header separator part, and denoted at 157 is an IEEE1394 I/F. The receiving apparatus according to the ninth preferred embodiment is connected with a sending apparatus 158 via an IEEE1394 bus. In FIG. 14, the copyright information extracting part 154, the data packet re-constructing part 155, the header separator part 156 and the IEEE1394 I/F 157 are the same as those described in relation to the eighth preferred embodiment.

The IEEE1394 I/F 157, first, receives an isochronous packet sent from the sending apparatus 158 which is connected with the IEEE1394 I/F 157, and the packet is divided into a packet header and a CIP and outputted to the header separator part 156, which is similar to that in the eighth preferred embodiment.

Another similarity to the eighth preferred embodiment is that the header separator part 156 retrieves a data block and divide/combine information from the received CIP and outputs them to the data packet re-constructing part 155, while at the same time outputting the received header to the copyright information multiplexing part 154.

The data packet re-constructing part 155 restores a data packet from the data block based on the received divide/combine information and outputs it to the TS packet extracting part 153, and the TS packet extracting part 153 extracts a TS packet portion from the received data packet and outputs it to the copyright information multiplexing part 152b.

The copyright information multiplexing part 154 retrieves copyright information from an SY area of the received packet header, and outputs it to the copyright information multiplexing part 152b.

The copyright information multiplexing part 152b, as shown in FIG. 17(d), replaces a sync byte of a TS packet with copyright information and accordingly creates an input/output packet, and outputs it to the application 151b.

As described above, according to this embodiment, since a sync byte of a TS packet is replaced with copyright information, it is possible to output both data and the copyright information to the application 151b at the same time.

Although this embodiment requires to replace a sync byte of a TS packet with the copyright information 114, copyright information may be written in other place. For example, as shown in FIG. 17(e), a similar effect is obtainable when an area for writing in copyright information is added.

Further, although the foregoing has described that copyright information and MPEG2 data are handled simultaneously, the present invention is applicable to other information as well except for copyright information. However such information is set in an isochronous packet, the present invention remains applicable.

Further, although the foregoing has described that data to be transmitted are MPEG2 data, data to be transmitted may be other data. For instance, an IEEE1394 I/F can send and receive DV data as well by the same protocol as when handling MPEG2 data. Thus, the present invention is applicable even to DV data.

Further, although the foregoing has described that the interface is an IEEE1394 I/F, other interface may be used.

Further, the sending apparatus may be realized by software and/or hardware.

Tenth Preferred Embodiment

Next, a tenth preferred embodiment of the present invention will be described with reference to FIG. 15.

Figure 15:
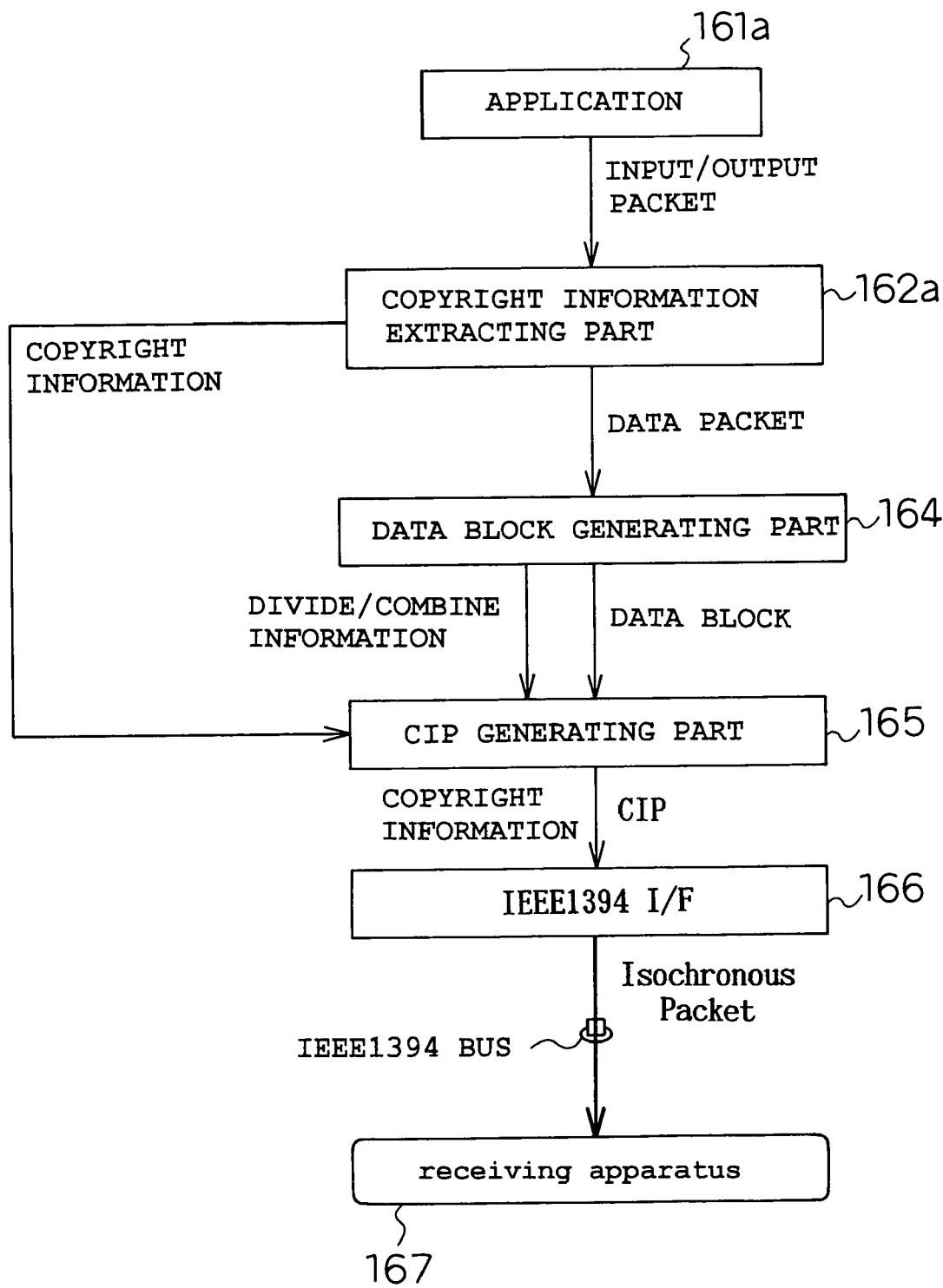
FIG. 15 is a block diagram of a receiving apparatus according to a tenth preferred embodiment.

FIG. 15 shows an example of a sending apparatus, wherein denoted at 161a is an application, denoted at 162a is a copyright information multiplexing part, denoted at 164 is a data block generating part, denoted at 165 is a CIP generating part, and denoted at 166 is an IEEE1394 I/F. The sending apparatus according to the tenth preferred embodiment is connected with a receiving apparatus 167 via an IEEE1394 bus.

The application 161a outputs an input/output packet as that shown in FIG. 17(a), for instance, to the copyright information multiplexing part 162a. The copyright information multiplexing part 162a extracts copyright information from the received input/output packet and outputs it to the CIP generating part 165, and at the same time, converts the input/output packet into a data packet and outputs it to the data block generating part 164. A portion which used to hold the copyright information may be only replaced with the pattern of the reserved, whereby conversion into a data packet is realized.

The data block generating part 164 determines to divide or combine the received data packet, converts the data packet into a data block, sets divide/combine information and outputs the data block and the divide/combine information to the CIP generating part 165.

The CIP generating part 165 adds a CIP header in which the received divide/combine information is set to the received data block, accordingly creates a CIP, and outputs it to the IEEE1394 I/F 166. The copyright information as well is outputted to the IEEE1394 I/F 166.

The IEEE1394 I/F 166 creates an isochronous packet based on the received CIP and copyright information and sends it to the receiving apparatus 167.

As described above, according to this embodiment, since an input/output packet superimposed on copyright information is used in a reserved area of a source packet header of a data packet and outputted via the application 161b, it is possible to handle both data and the copyright information in synchronization to each other.

Although this embodiment requires to superimpose copyright information in a reserved area, copyright information may be written in other place. For example, as shown in FIG. 17(b), since a sync byte of an TS packet has a fixed value, the original value can be obtained easily even after written over with copyright information, and therefore, superimposing in this area is possible. Alternatively, as shown in FIG. 17(c), a similar effect is obtainable when an area for writing in copyright information is added.

Further, although the foregoing has described that copyright information and MPEG2 data are handled simultaneously, the present invention is applicable to other information as well except for copyright information. However such information is set in an isochronous packet, the present invention remains applicable.

Further, although the foregoing has described that data to be transmitted are MPEG2 data, data to be transmitted may be other data. For instance, an IEEE1394 I/F can send and receive DV data as well by the same protocol as when handling MPEG2 data. Thus, the present invention is applicable even to DV data.

Further, although the foregoing has described that the interface is an IEEE1394 I/F, other interface may be used.

Further, the sending apparatus may be realized by software and/or hardware.

Eleventh Preferred Embodiment

Next, an eleventh preferred embodiment of the present invention will be described with reference to FIG. 16.

Figure 16:
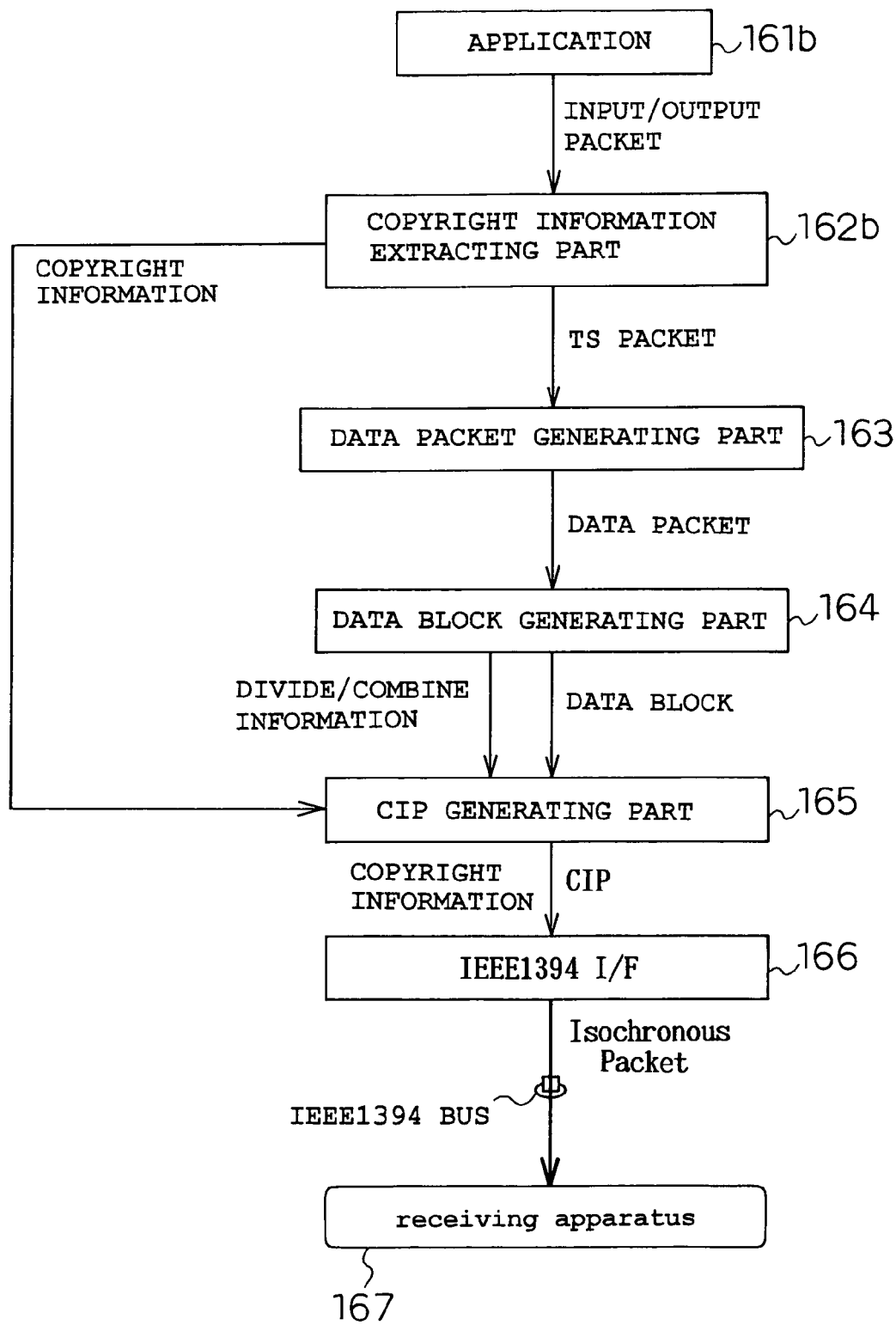
FIG. 16 is a block diagram of a receiving apparatus according to an eleventh preferred embodiment.

FIG. 16 shows an example of a sending apparatus, wherein denoted at 161b is an application, denoted at 162b is a copyright information extracting part, denoted at 163 is a data packet generating part, denoted at 164 is a data block generating part, denoted at 165 is a CIP generating part, and denoted at 166 is an IEEE1394 I/F. The sending apparatus according to the eleventh preferred embodiment is connected with a receiving apparatus 167 via an IEEE1394 bus. In FIG. 16, the data block generating part 164, the CIP generating part 165, the IEEE1394 bus 166, and the receiving apparatus 167 are the same as those described in relation to the tenth preferred embodiment.

The application 161b outputs an input/output packet as that shown in FIG. 17(d), for instance, to the copyright information extracting part 162b. The copyright information extracting part 162b extracts copyright information from the received input/output packet and outputs it to the CIP generating part 165, and at the same time, converts the input/output packet into a TS packet and outputs it to the data packet generating part 163. A portion which used to hold the copyright information may be only replaced with the pattern of a sync byte, whereby conversion into a TS packet is realized.

The data packet generating part 163 creates a time stamp, converts the TS packet into a data packet, and outputs it to the data block generating part 164. The time stamp is created based on time information which is in a TS packet (known as "PCR") so as to be restored on the receiving side. The PCR is prepared in such a manner that an MPEG2 decoder can restore video and speech at the correct timing.

The data block generating part 164 determines to divide or combine the received packet, converts the data packet into a data block, sets divide/combine information and outputs the data block and the divide/combine information to the CIP generating part 165, which is similar to that in the tenth preferred embodiment.

Another similarity to the tenth preferred embodiment is that the CIP generating part 165 outputs to the IEEE1394 I/F 166 copyright information and a CIP which is created by adding a CIP header in which the received divide/combine information is set to the received data block.

Yet another similarity to the tenth preferred embodiment is that the IEEE1394 I/F 166 creates an isochronous packet based on the received CIP and copyright information and sends it to the receiving apparatus 167.

Although this embodiment requires to replace a sync byte of a TS packet with copyright information, copyright information may be written in other place. For example, as shown in FIG. 17(e), a similar effect is obtainable when an area for writing in copyright information is added.

Further, although the foregoing has described that the data packet generating part 163 creates a time stamp based on PCR, as far as the application 161b is capable of outputting at the correct timing owing to software or hardware, it is also possible to create a time stamp from a time at which a TS packet 204 is received by the data packet generating part 163.

Further, although the foregoing has described that copyright information and MPEG2 data are handled simultaneously, the present invention is applicable to other information as well except for copyright information. However such information is set in an isochronous packet, the present invention remains applicable.

Further, although the foregoing has described that data to be transmitted are MPEG2 data, data to be transmitted may be other data. For instance, an IEEE1394 I/F can send and receive DV data as well by the same protocol as when handling MPEG2 data. Thus, the present invention is applicable even to DV data.

Further, although the foregoing has described that the interface is an IEEE1394 I/F, other interface may be used.

Further, the sending apparatus may be realized by software and/or hardware.

Twelfth Preferred Embodiment

Figure 19:
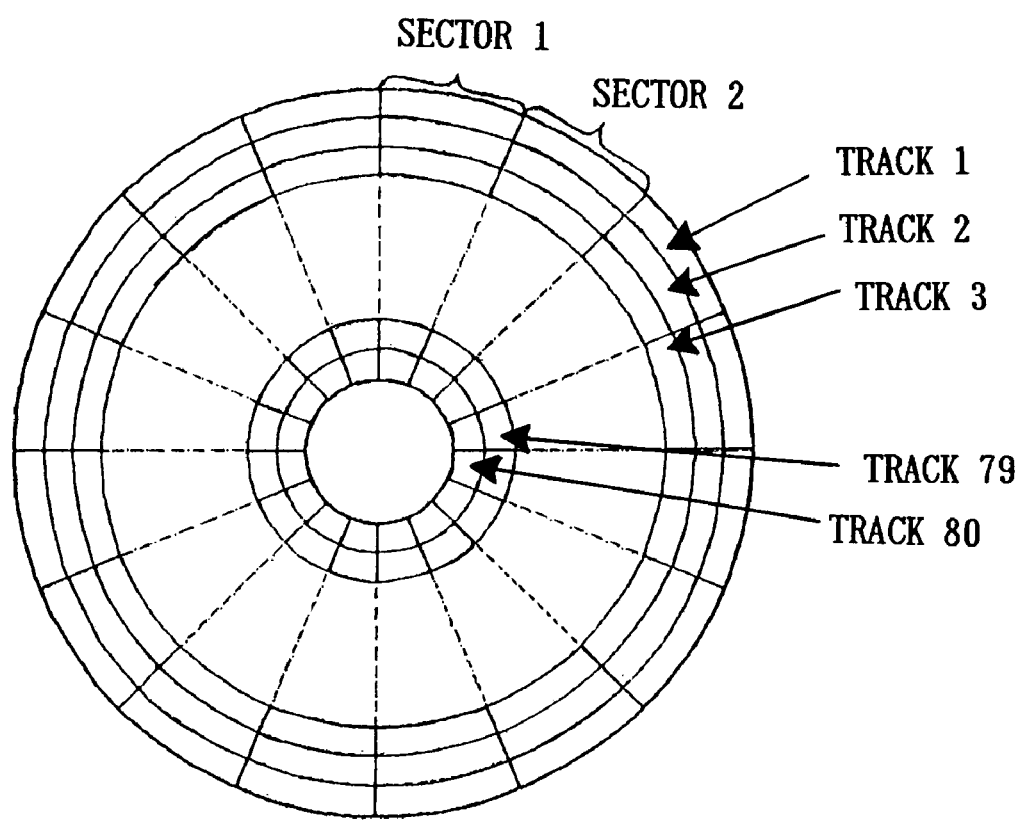
FIGS. 19(*a*)–19(*c*) are explanatory diagrams of what is realized by a program which is a twelfth preferred embodiment.
Figure 19:
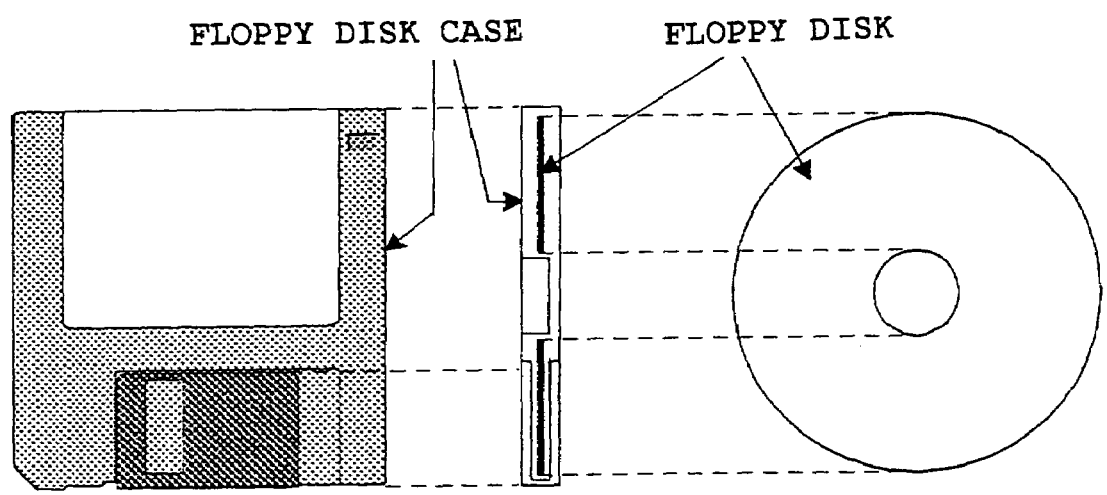

The present invention is realized by a program for a computer, a microcomputer or the like, and if recorded in a recording medium such as a floppy disk and transported, the present invention is implemented easily in other independent system. FIG. 19 is a drawing for describing implementation using a floppy disk.

FIG. 19(a) shows an example of a physical format of a floppy disk which is a recording medium main part. Tracks are formed in a concentric circle arrangement inwardly from outside and divided into sixteen sectors in angle directions. A program is recorded in accordance with areas which are allocated in this fashion.

FIG. 19(b) is a drawing for describing a case which houses this floppy disk. From the left-hand side are the floppy disk case as viewed from the front, the floppy disk case in cross section, and the floppy disk. With the floppy disk thus housed in the case, the disk is protected against dust and external impact and transported safely.

Figure 19C:
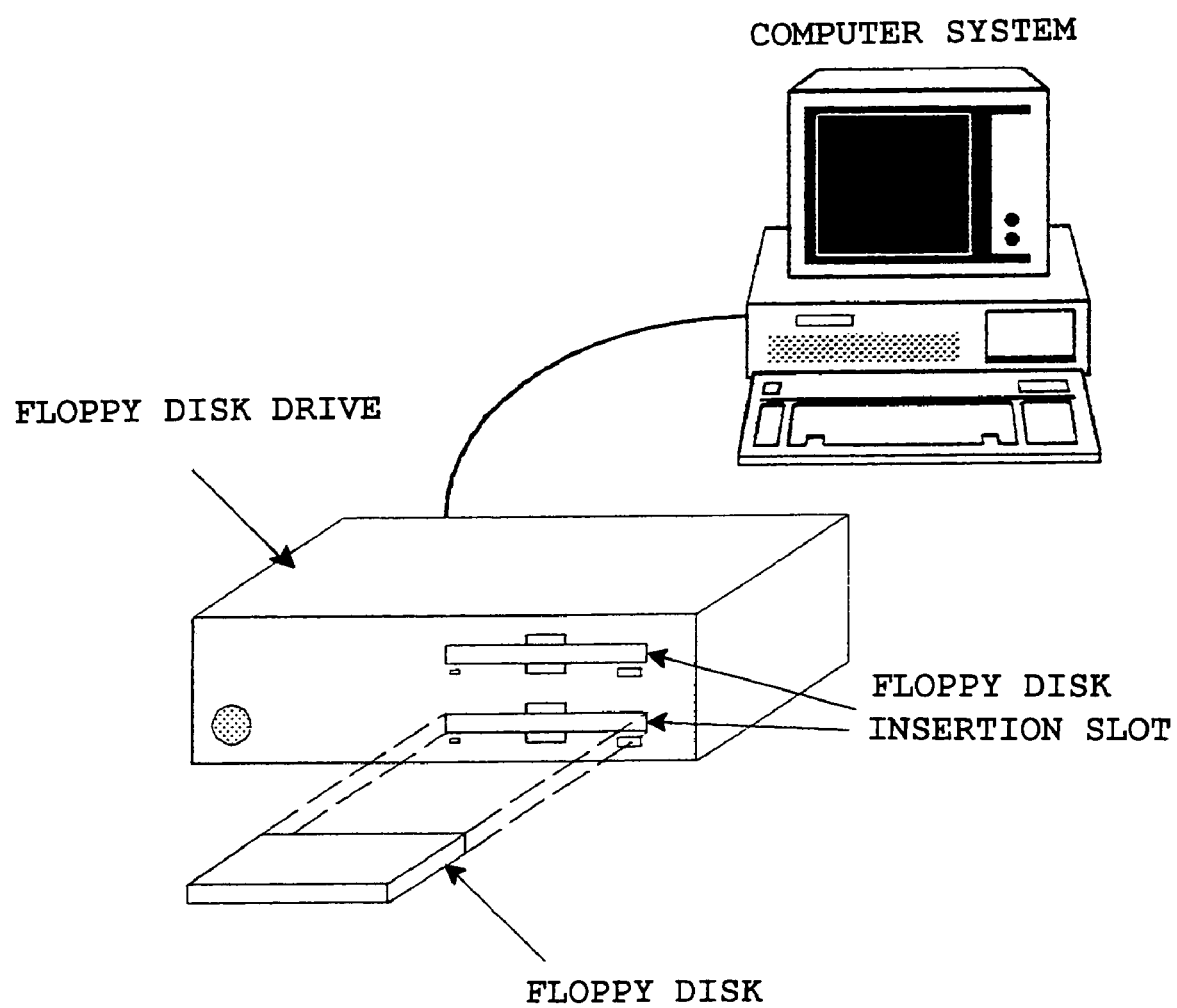

FIG. 19(c) is a drawing for describing recording and reproduction of a program on a floppy disk. As a floppy disk drive is connected with a computer system in a manner as that shown in this drawing, it is possible to record and reproduce a program on a disk. A disk is loaded in and unloaded from the floppy disk drive through an insertion slot. With the program recorded on the disk from the computer system via the floppy disk drive, the program for realizing the present invention is saved. In order to implement the present invention, the floppy disk drive reads the program from the disk, transfers to the computer system and creates an environment for realizing the present invention.

Although the foregoing has described that a floppy disk is used as a recording medium in this embodiment, an optical disk may be used for a similar end. In addition, a recording medium is not limited to this but may be any other on which the program can be recorded, such as an IC card, a ROM and a cassette, for similar implementation.

As herein referred to, "data" include a data structure, a data format, a data type, etc.

"Mediums" include recording mediums such as a ROM, transmission mediums such as the Internet, and transmission mediums such as light, electric waves and acoustic waves.

"Carried mediums" include a recording medium in which a program and/or data are recorded, transmission mediums for transmitting a program and/or data, and the like.

"Can be processed on a computer" covers, in the case of a recording medium such as a ROM, that the medium can be read on a computer, and in the case of a transmission medium, that a computer can handle the program and/or data to be transmitted as a result of transmission.

The present invention may be directed to a program recording medium in which a program and/or data for making a computer execute all or some functions of all or some means of the structure elements described in relation to the preferred embodiments above is recorded, which can be read on a computer so that the read-out program and/or data execute the functions while working in cooperation with the computer.

Further, an aggregation of information includes software such as a program and/or data, for example.

AVAILABILITY FOR INDUSTRIAL USE

As is clear from the above, the present invention solves a problem with the conventional techniques that a DV, sending and receiving stream data, can not respond to an asynchronous random access described earlier and a mechanism for dealing with such an access is necessary.

In addition, the present invention solves a problem that despite the recent ongoing fusion of PCs and digital video/audio equipment such as DVs, since PCs have never initially considered handling synchronous data, the current mechanisms can not handle real-time data without a break.

Moreover, the present invention meets a challenge that a new mechanism to handle AV data in accordance with copy right information is necessary to send and receive AV data between PCs and other AV equipment.

The invention claimed is:

1. A data transmission apparatus, comprising:
    time intervals generating means which newly generates predetermined time interval information, when transmitting information, without embedding said information;
    outputting means which outputs a series of data frames as stream data based on said generated predetermined time interval information received from said time intervals generating means;
    buffering means which stores said output stream data and said generated predetermined time interval information received from said outputting means;
    sending means which receives said stored stream data from said buffering means, divides said stored stream data into packet data and outputs said packet data; and
    transmission managing means which enters said stored stream data from said buffering means to said sending means based on said stored predetermined time interval information received from said buffering means.

2. The data transmission apparatus of claim 1, wherein said predetermined time interval information is set up to correspond to necessary timing.

3. The data transmission apparatus of claim 2, wherein said necessary timing is based on a frame frequency of said series of data frames.

4. The data transmission apparatus of any one of claims 1 through 3, wherein said transmission managing means provides said time intervals generating means with a correction instruction which is for correcting said predetermined time interval information in accordance with a condition of burden upon said sending means,
    and said time intervals generating means generates said predetermined time interval information without receiving the correction instruction or considering the correction instruction.

5. The data transmission apparatus of any one of claims 1 through 3, wherein said transmission managing means does not provide said time intervals generating means with a correction instruction which is for correcting said predetermined time interval information in accordance with a condition of burden upon said sending means.

6. The data transmission apparatus of any one of claims 1 through 3, wherein said predetermined time interval information is expressed as groups of a start time and an end time of said data frames.

7. The data transmission apparatus of any one of claims 1 through 3, wherein said stream data are data for a digital VCR.

8. The data transmission apparatus of any one of claims 1 through 3, wherein said outputting means reproduces data for a digital VCR.

9. A data transmission apparatus, comprising:
    data conversion means comprising:
    packet generating means which divides input stream data and adds header information to each piece to produce packets; and
    packet processing start time inserting means which inserts calculated packet processing start time information into the header information of at least a first packet of each frame of said stream data, said data conversion means outputting the packets produced by said data conversion means; and
    an interface comprising:
    transmission start time controlling means which controls transmission start time based on said packet processing start time information, said interface outputting to a bus the packets processed by said data conversion means at said transmission start time,
    wherein the packet processing start time information for only the first packet of the first frame uses a transmission start time for the first packet of the first frame and a predetermined transmission start time delay,
    the packet processing start time information for the first packet of each of the remaining frames uses the packet processing start time information determined for the first packet of the first frame,
    said packet processing start time information of the first packet of each frame of said stream data is expressed by:

$T1 = X + Z + Y(N-1)$, (where $X \geq 0$, $Z \geq 0$) X denotes the transmission start time for the first packet of the first frame, N denotes a frame number, Y denotes a frame period, Z denotes the predetermined transmission start time delay, and T1 denotes the packet processing start time information of said packets.

10. The data transmission apparatus of claim 9, wherein said bus is an IEEE1394 bus, and said interface is an IEEE1394 interface.

11. The data transmission apparatus of claim 9 or 10, wherein said stream data are data for a digital VCR, said Z is a value around 250 microseconds, and said Y is a value which is based on a frame frequency of said stream data.

12. A medium which can be processed on a computer and which carries a program and/or data for making a computer execute all functions of all means of the data transmission apparatus of any one of claims 1 through 3 or 9 or 10.

13. An aggregation of information which is a program and/or data for making a computer execute all functions of all means of the invention according to any one of claims 1 through 3 or 9 or 10.

14. A receiving apparatus, comprising:
  an interface which receives a transmission packet which contains a transmission path header in which additional information is allocated in the transmission path header and data blocks;
  transmission path header separator means which separates said transmission packet into said transmission path header and said data blocks;
  additional information extracting means which extracts said additional information from said transmission path header;
  data packet generating means which generates from said data blocks a data packet which is obtained by combining one or more of said data blocks; and
  additional information inserting means which adds or inserts said additional information to said data packet and outputs as an output packet the data packet together with said additional information of a type of data format which can be processed by an application simultaneously,
  wherein said application processes the packet output from said additional information inserting means.

15. The receiving apparatus of claim 14, wherein said data packet is formed by a source packet header and a transport packet in MPEG2 data.

16. The receiving apparatus of claim 14 or 15, wherein said additional information inserting means adds said additional information to a beginning or an end of said data packet.

17. The receiving apparatus of claim 15, wherein said additional information inserting means inserts said additional information to said source packet header.

18. A receiving apparatus, comprising:
  an interface which receives a transmission packet which contains a transmission path header in which additional information is allocated in the transmission path header and data blocks;
  transmission path header separator means which separates said transmission packet into said transmission path header and said data blocks;
  additional information extracting means which extracts said additional information from said transmission path header;
  data packet generating means which generates from said data blocks a data packet which is obtained by combining one or more of said data blocks;
  source packet header separator means which separates said data packet into a source packet header and a source packet; and
  additional information inserting means which adds or inserts said additional information to said source packet or replaces other data of said source packet with said additional information, and outputs as an output packet the source packet together with said additional information of a type of data format which can be processed by an application simultaneously,
  wherein said application processes the packet output from said additional information inserting means.

19. The receiving apparatus of claim 18, wherein said source packet is a transport packet in MPEG2 data.

20. The receiving apparatus of claim 19, wherein said additional information inserting means adds said additional information to a beginning or an end of said transport packet.

21. The receiving apparatus of claim 19, wherein said additional information inserting means replaces a sync byte of said transport packet with said additional information.

22. The receiving apparatus of any one of claims 14 or 18, wherein said interface is an IEEE1394 interface, and said transmission packet is an isochronous packet.

23. The receiving apparatus of any one of claims 14 or 18, wherein said additional information is copyright information.

24. The receiving apparatus of claim 22, wherein said additional information is allocated in an SY area of said isochronous packet.

25. A sending apparatus, comprising:
  additional information separator means which, upon receipt of an input packet of a type of data format which can be processed by an application simultaneously, retrieves additional information which is added or inserted to a data packet, said data packet and said additional information forming said input packet;
  data block generating means which generates one or more data blocks from said data packet;
  transmission packet generating means which executes predetermined processing on said data blocks, inserts said additional information at a predetermined location in a transmission path header of said data blocks, and generates a transmission packet; and
  an interface which sends said transmission packet.

26. The sending apparatus of claim 25, wherein said data packet is formed by a source packet header and a transport packet in MPEG2 data.

27. The sending apparatus of claim 25 or 26, wherein in said input packet, said additional information is added to a beginning or an end of said data packet.

28. The sending apparatus of claim 26, wherein in said input packet, said additional information is inserted to said source packet header.

29. A sending apparatus, comprising:
  additional information separator means which, upon receipt of an input packet of a type of data format which can be processed by an application simultaneously, retrieves additional information, said additional information either 1) added or inserted to the source packet or 2) replacing other data of said source packet, said source packet and said additional information forming said input packet;
  data packet generating means which combines a source packet header with said source packet to generate a data packet;
  data block generating means which generates one or more data blocks from said data packet;

transmission packet generating means which executes predetermined processing on said data blocks, inserts said additional information at a predetermined location in a transmission pather header of said data blocks, and generates a transmission packet; and an interface which outputs said transmission packet.

30. The sending apparatus of claim 29, wherein said source packet is a transport packet in MPEG2 data.

31. The sending apparatus of claim 30, wherein, in said input packet, said additional information is allocated to a position of a sync byte of said transport packet.

32. The sending apparatus of claim 30, wherein in said input packet, said additional information is added to a beginning or an end of said transport packet.

33. The sending apparatus of any one of claims 25 or 29, wherein said interface is an IEEE1394 interface, and said transmission packet is an isochronous packet.

34. The sending apparatus of any one of claims 25 or 29, wherein said additional information is copyright information.

35. The sending apparatus of claim 33, wherein said additional information is allocated in an SY area of said isochronous packet.

36. A medium which can be read on a computer and which holds a program for making a computer execute all of the respective means or the respective structural elements which form the receiving apparatus or the sending apparatus according to any one of claims 14 or 15 or 18 or 19 or 25 or 26 or 29 or 30.

37. An aggregation of information which is a program and/or data for making a computer execute all functions of all means of the invention according to any one of claims 14 or 15 or 18 or 19 or 25 or 26 or 29 or 30.

38. The receiving apparatus of claim 15, wherein said additional information inserting means replaces a sync byte of said transport packet with said additional information.

39. The sending apparatus of claim 26, wherein, in said input packet, said additional information is allocated to a position of a sync byte of said transport packet.

* * * * *

UNITED STATES PATENT AND TRADEMARK OFFICE
CERTIFICATE OF CORRECTION

PATENT NO. : 7,194,548 B1 Page 1 of 1
APPLICATION NO. : 09/937934
DATED : March 20, 2007
INVENTOR(S) : Chiyoko Matsumi et al.

It is certified that error appears in the above-identified patent and that said Letters Patent is hereby corrected as shown below:

<u>Title Page, Item (75) Inventors</u>
Delete "Chiyoko Matsumi"
Delete "Yukio Kurano"

Signed and Sealed this

Thirteenth Day of November, 2007

JON W. DUDAS
*Director of the United States Patent and Trademark Office*